United States Patent [19]
Okano et al.

[11] 4,124,276
[45] Nov. 7, 1978

[54] SOFT FOCUS LENS SYSTEM

[75] Inventors: Yukio Okano, Minamikawachi; Akiyoshi Nakamura, Sakai; Toshinobu Ogura, Tondubayashi, all of Japan

[73] Assignee: Minolta Camera Kabushiki Kaisha, Japan

[21] Appl. No.: 750,824

[22] Filed: Dec. 15, 1976

[30] Foreign Application Priority Data

Dec. 22, 1975 [JP] Japan ................. 50/154540
Sep. 10, 1976 [JP] Japan ................. 51/109281

[51] Int. Cl.² .............................. G02B 13/20
[52] U.S. Cl. ......................... 350/188; 350/255
[58] Field of Search ................. 350/188, 255

[56] References Cited
U.S. PATENT DOCUMENTS 1,446,634  2/1923  Bell et al. ..................... 350/188
1,463,132  7/1923  Graf ............................. 350/188
2,381,098  8/1945  Bahn ............................ 350/255

Primary Examiner—Paul A. Sacher
Attorney, Agent, or Firm—Harold L. Jackson; Stanley R. Jones; Joseph W. Price

[57] ABSTRACT

A variable soft focus lens system particularly adapted for photography is provided. The soft focus lens system includes at least two lens groups defining a meniscus shaped air space there between. The relative width of the air space can be variable by movement of one of the lens groups relative to the other. This movement can introduce a controlled amount of spherical aberration to provide within certain parameters a soft focus image with an acceptable Petzval sum and flatness of the image plane. Various embodiments of the present invention within the inventive parameters can be utilized and include both stationary and variable soft focus lens system.

22 Claims, 84 Drawing Figures

Spherical Aberration

Astigmatism

Coma  w=10°

Spherical Aberration

Astigmatism

Coma  w=10°

Spherical Aberration

Astigmatism

Coma ω=10°

Spherical Aberration

Astigmatism

Spherical Aberration

Astigmatism

Spherical Aberration

Astigmatism

Spherical Aberration

Astigmatism

Spherical Aberration

Astigmatism

Spherical Aberration

Astigmatism

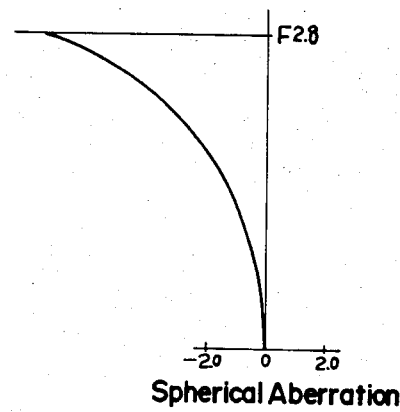
FIG.14a Spherical Aberration
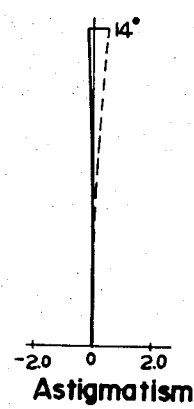
FIG.14b Astigmatism
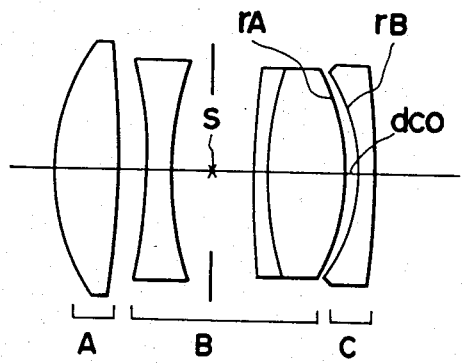
FIG.15
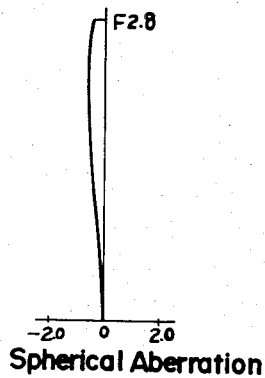
FIG.16a Spherical Aberration
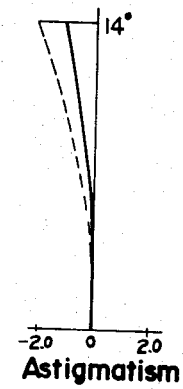
FIG.16b Astigmatism

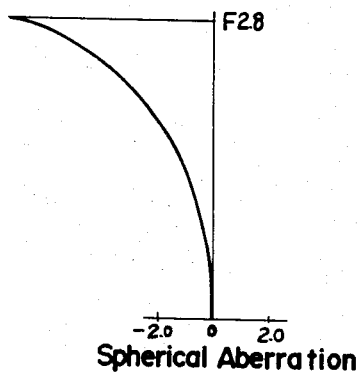
FIG.17a Spherical Aberration F2.8
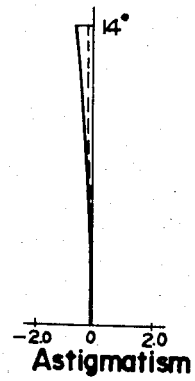
FIG.17b Astigmatism 14°
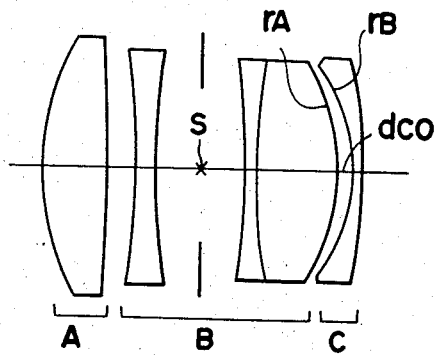
FIG.18
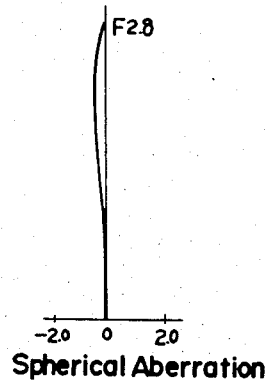
FIG.19a Spherical Aberration F2.8
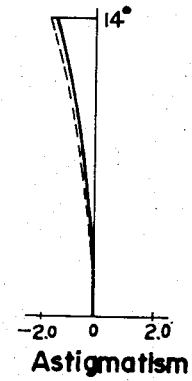
FIG.19b Astigmatism 14°

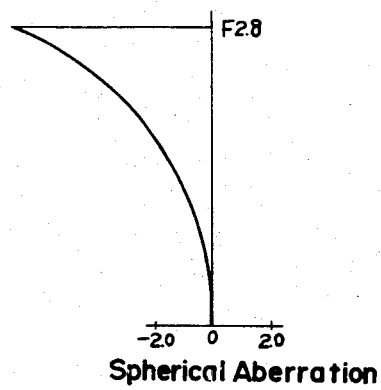
FIG.20a Spherical Aberration
FIG.20b Astigmatism
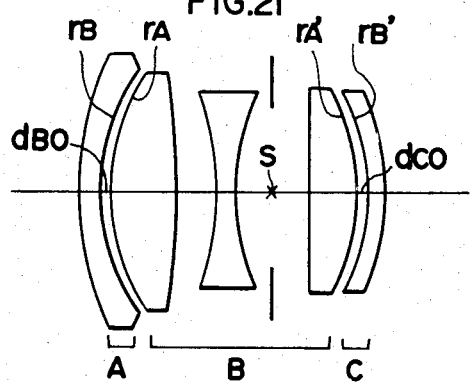
FIG.21
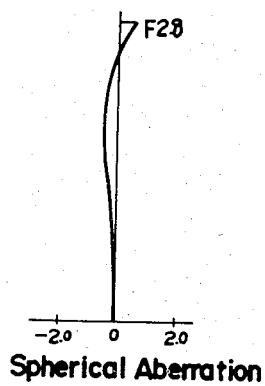
FIG.22a Spherical Aberration
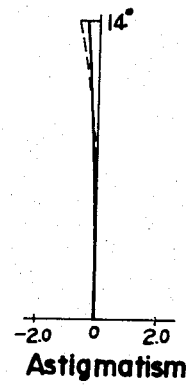
FIG.22b Astigmatism

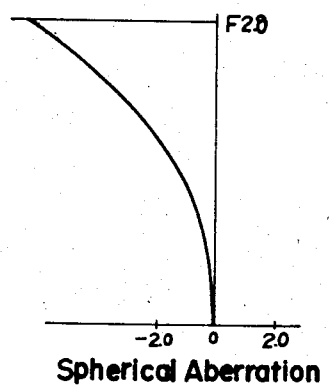
FIG.23a — Spherical Aberration
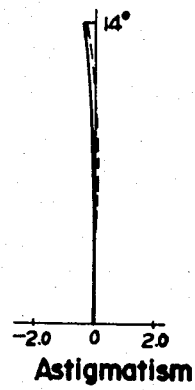
FIG.23b — Astigmatism
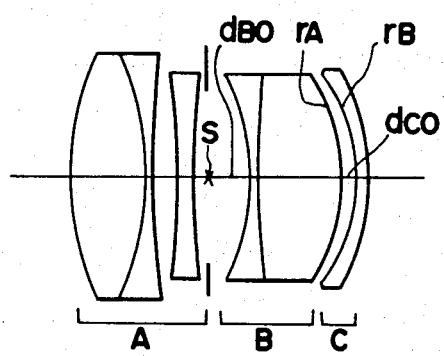
FIG.24
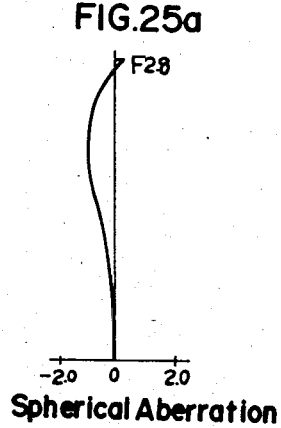
FIG.25a — Spherical Aberration
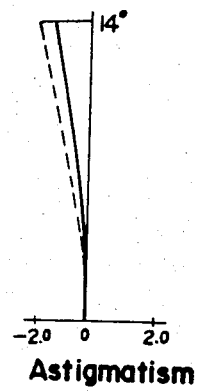
FIG.25b — Astigmatism Spherical Aberration Astigmatism

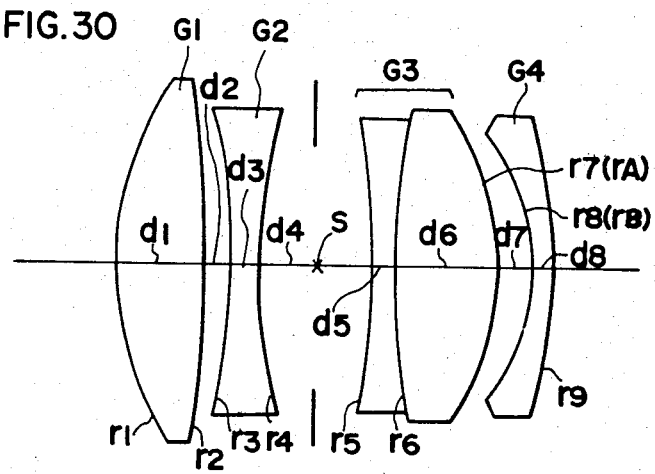
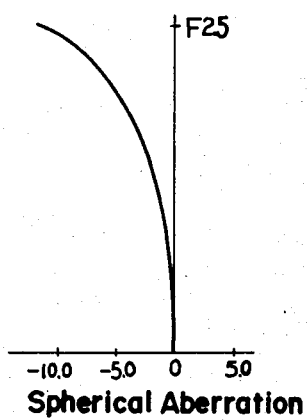
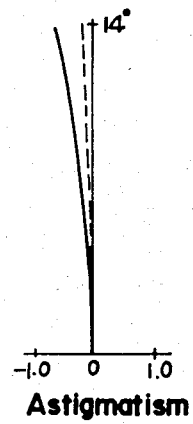
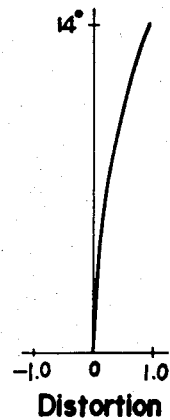
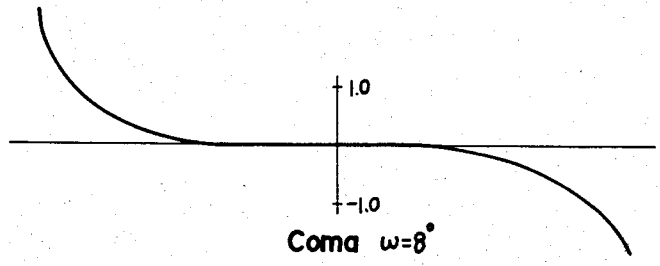

Spherical Aberration

Astigmatism

Distortion

Coma ω=8°

Spherical Aberration

Astigmatism

Distortion

Coma ω=8°

Spherical Aberration

Astigmatism

Distortion

Coma  w=7°

Spherical Aberration

Astigmatism

Distortion

Coma  ω=7°

SOFT FOCUS LENS SYSTEM

BACKGROUND OF THE INVENTION

1. Field of the Invention

The present invention relates to an objective soft focus lens system for use in photography and more particularly to an improved soft focus lens system that eliminates undesirable aberrations.

2. Brief Description of the Prior Art

Soft focus lens system have been used in the photography field for a considerable period of time. Various different soft focus lens systems have been suggested such as those disclosed in U.S. Pat. No. 2,233,591; U.S. Pat. No. 1,370,885; U.S. Pat. No. 3,843,235; U.S. Pat. No. 3,397,023; U.S. Pat. No. 3,045,530; U.S. Pat. No. 2,959,105 and U.S. Pat. No. 3,476,457. Various apodization optical systems have also been described for achieving a blurred or soft focus image of a target photographing object. Frequently, soft focus filters have been suggested which are permanently mounted in a lens barrel, traversely removable from the lens barrel or attached to the end of the lens barrel.

One of the known ways of designing a soft focus lens system is to intentionally increase the amount of spherical aberration beyond the normal tolerance limits. By varying the spherical aberration introduced into the image an adjustable soft focus lens system can be achieved and such a system is disclosed in British Pat. No. 198,569 published June 7, 1923. The object of the British patent reference was to provide a soft focus objective and high speed anastigmatic combination lens system. This was accomplished by providing at least two sets of lenses wherein one lens was adjusted relative to the other lens set for the purpose of changing the lens from an anastigmatic to a soft lens.

The prior art has experienced difficulties in achieving a satisfactory commercial soft focus lens system that can be economically produced free from undesirable aberrations. These undesirable aberrations are usually introduced into the lens system by any variation in the introduction of spherical aberration. Frequently, the focus of the lens of the total lens system is usually not maintained during the variation of the spherical aberration and the operator has to re-adjust the focusing of the total lens system when the spherical aberration is varied. As can be readily appreciated the adjustment of the focus of the total lens system can be difficult when viewing a soft tone image through the viewfinder.

The prior art has not suggested an improved soft focus lens system that is capable of providing a highly desirable portrait image with a minimum of aberrations.

SUMMARY OF THE INVENTION

An object of the present invention is to provide an improved soft focus lens system wherein the resulting softness of the transmitted image can be varied by changing the degree of spherical aberration without introducing additional undesirable aberrations.

Another object of the present invention is to provide a soft focus lens system which can be initially focused and maintained in a focused position irregardless of the variation in the softness of the transmitted image.

Still another object of the present invention is to provide an improved soft focus lens system wherein the form of the transmitted image is continuously variable between a sharp tone and a maximum soft tone while being kept in a focused condition with a minimal introduction of undesirable aberration.

A further object of the present invention is to provide an improved soft focus lens system which is capable of transmitting a soft focused point image consisting of a finally focused nucleus and a flare surrounding it for performing an ideal soft tone picture.

An improved soft focus lens system is provided having a pair of lens groups. Means are provided for varying the position of a first lens group relative to the position of the second lens group for varying the spherical aberration introduced into the lens system to provide a desirable soft focus transmitted image. Means are also provided for maintaining the focus condition of the total lens system during any variation of the position of the first lens group and the second lens group. A meniscus shaped air space can be formed between the first and second lens group and can be variable during the introduction of the spherical aberration. The first lens group can have a rear refracting surface that is concave to the point of intersection of an off-axial ray trace with the optical axis. A second lens group can have a second refracting surface also concave to the point of intersection and forming with the first refracting surface the meniscus shaped air space. The radius of curvature, $r_A$ of the first refracting surface and the radius of curvature, $r_B$ of the second refracting surface may be determined within the following ranges, respectively with the focal length of the lens system represented by $f$:

$$0.20 < |r_A|/f < 0.65 \quad (1)$$
$$0.18 < |r_B|/f < 0.45 \quad (2)$$

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIGS. 14a and 14b are graphical plots of the aberrations of the fourth embodiment;

FIG. 15 is a schematic view of a fifth embodiment of the present invention;

FIGS. 16a and 16b are graphical plots of the aberrations of the fifth embodiment;

FIGS. 17a and 17b are graphical plots of the aberrations of the fifth embodiment;

FIG. 18 is a schematic view of a sixth embodiment of the present invention;

FIGS. 19a and 19b are graphical plots of the aberrations of the sixth embodiment;

FIGS. 20a and 20b are graphical plots of the aberrations of the sixth embodiment;

FIG. 21 is a schematic view of a seventh embodiment of the present invention;

FIGS. 22a and 22b are graphical plots of aberrations of the seventh embodiment;

FIGS. 23a and 23b are graphical plots of aberrations of the seventh embodiment;

FIG. 24 is a schematic view of an eighth embodiment of the present invention;

FIGS. 25a and 25b are graphical plots of aberrations of the eighth embodiment;

FIG. 30 is a schematic view of a ninth embodiment of the present invention;

FIGS. 31a, 31b, 31c and 31d are graphical plots of aberrations of the ninth embodiment;

DESCRIPTION OF THE PREFERRED EMBODIMENTS

The following description is provided to enable any person skilled in the optical art to make and use the invention and sets forth the best modes contemplated by the inventors of carrying out their inventions. Various modifications, however, will remain readily apparent to those skilled in the art, since the generic principles of the present invention have been defined herein specifically to provide a soft focus optical lens system that can be manufactured in a relatively economical manner.

Figure 1:
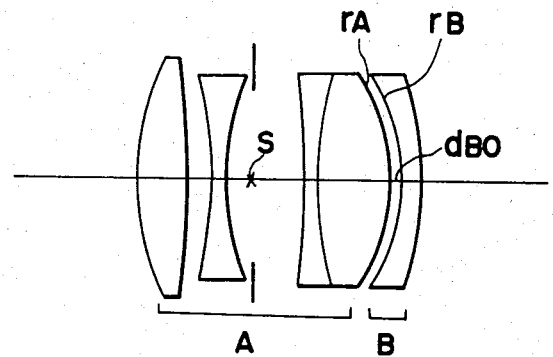
FIG. 1 is a schematic view of a first embodiment of the present invention.

Referring to FIG. 1 the first embodiment of the present invention is disclosed. The inventive lens system is divided into a lens group A and a lens group B. As can be appreciated, the conventional optical diagram symbols are utilized with the object on the left-hand side of FIG. 1 and the image on the right-hand side. The rear lens group B is separated from the lens group A by a variable air space dB0. The variable air space dB0 has a meniscus shape defined between the two refracting surfaces $r_A$ and $r_B$.

The position, S, on the optical axis defines the intersection of an off-axial principle ray with the optical axis. The respective refracting surface $r_A$ and $r_B$ are concave relative to the position S. In determining the position S, the term "off-axial principle ray" refers to the center ray of a meridional pencil of rays incident on a lens system at an angle of half the maximum field angle of the lens system when it is in its full open aperture position. As symbolicly represented in FIG. 1 position S, wherein the off-axial principle ray intersects with the optical axis, is generally the position of the diaphragm. Preferably, to achieve desired results in the embodiment of FIG. 1, the radius of curvature of the surface $r_B$ will be smaller than the radius of curvature of the surface $r_A$.

The parameters of the first embodiment can be seen in the following Table 1:

Table 1

| (Embodiment 1) $f=100.0$ $FNo.=2.8$ $2\omega=28°$ Back Focal Distance $s'=75.96$ | | | | |
|---|---|---|---|---|
| | Radius of Curvature | Axial Distance | Refractive Index | Abbe Number |
| | $r_{A1}$ 44.563 | | | |
| | | $d_{A1}$ 8.23 | $N_{A1}$ 1.7435 | $\nu_{A1}$ 49.2 |
| | $r_{A2}$ −175.651 | | | |
| | | $d_{A2}$ 4.31 | | |
| | $r_{A3}$ −67.869 | | | |
| | | $d_{A3}$ 3.31 | $N_{A2}$ 1.64769 | $\nu_{A2}$ 33.9 |
| A | $r_{A4}$ 44.549 | | | |
| | | $d_{A4}$ 12.60 (diaphragm) | | |
| | $r_{A5}$ −186.235 | | | |
| | | $d_{A5}$ 2.59 | $N_{A3}$ 1.54072 | $\nu_{A3}$ 46.8 |
| | $r_{A6}$ 70.126 | | | |
| | | $d_{A6}$ 12.06 | $N_{A4}$ 1.6935 | $\nu_{A4}$ 50.3 |
| | $r_{A7}$ −32.535 | | | |
| | | $d_{B0}$ 2.0 (variable) | | |
| B | $r_{B1}$ −29.154 | | | |
| | | $d_{B1}$ 3.29 | $N_{B1}$ 1.61293 | $\nu_{B1}$ 37.0 |
| | $r_{B2}$ −53.379 | | | |

In accordance with the present invention, the amount of spherical aberration that is desired to be introduced into the final image to provide a soft tone or soft focus effect can be accomplished by varying the width of the air space dB0 by the relative movement of the lens groups A and B. The actual value dB0 shown in Table 1 is for an air space position in a normal photographic condition wherein the spherical aberration is corrected to that level of spherical aberration tolerances acceptable in an ordinary photographic lens for obtaining a sharp image. The permissible tolerance of spherical aberration in this condition can be seen in the graphic plot of FIG. 2a. Additionally the astigmatism and coma for this position is disclosed is respectively FIGS. 2b and 2c.

Figure 3A:
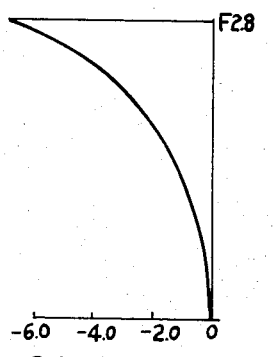
FIGS. 3a, 3b and 3c disclose the graphical plots of aberrations for soft focus having an under correction of spherical aberration.
Figure 3B:
Figure 3C:
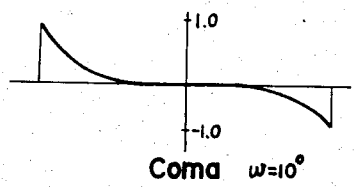

By varying the width, dB0 it is possible to create a variation in the spherical aberration introduced into the lens system. In other words, when the air space dB0 is widened by the relative movement of lens group A from lens group B, then the spherical aberration will be under-corrected. Resulting aberrations, for example when dB0 equals 3.50, are shown in FIGS. 3a, 3b and 3c respectively. Conversely when the space dB0 is narrowed from that disclosed in FIG. 1, then the spherical aberrations will be over-corrected. Again the resultant aberrations will be over-corrected. Again the resultant aberrations are graphically plotted in FIGS. 4a, 4b and 4c for the condition when dB0 equals 1.00.

Figure 2A:
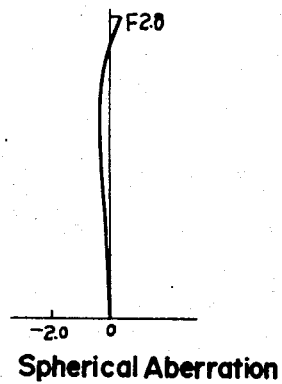
FIGS. 2a, 2b, and 2c are respectively, graphical plots of the spherical aberration, astigmatism and coma for normal photography.
Figure 2B:
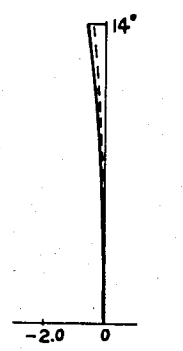
Figure 2C:
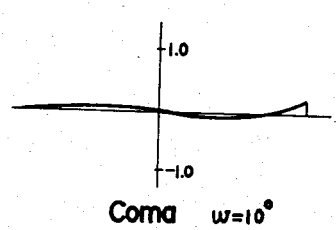
Figure 4A:
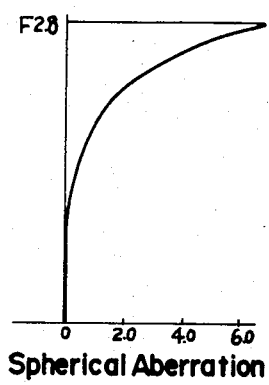
FIGS. 4a, 4b and 4c disclose graphical plots of the aberrations existing for soft focus with over correction of spherical aberration.
Figure 4B:
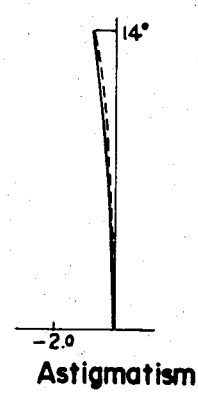
Figure 4C:
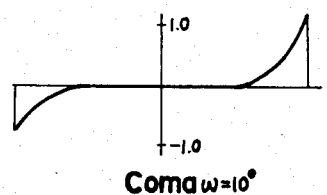

From a relative comparison of the spherical aberration plots in FIGS. 2a, 3a and 4a, it can be seen that the spherical aberration introduced into this lens system can vary over a large range, while the astigmatism plotted in FIGS. 2b, 3b and 4b remains virtually unchanged.

As a general rule, when the spherical aberration introduced into the transmitted image is at least 20δF δ: permissible circle of confusion) the lens can be used as a soft focus lens. A lens system such as the embodiment shown in FIG. 1 permits both the transmission of a sharp image for normal photographic purposes as well as the introduction of a controlled amount of spherical aberration to provide a highly desirable portrait soft focus lens.

The introduction of the spherical aberration in a controlled desirable manner is accomplished through the specific designing of the meniscus lens shaped air space wherein the light rays are convergent within the image space of the lens system. A light ray pencil incident on the lens system, parallel with the optical axis, will be refracted in a convergent direction as it exits from the surface $r_A$ into the air space dB0 in FIG. 1 because the lens group A provides a positive refracting power. The incident of a marginal ray of the light pencil on the surface $r_B$ will vary in distance relative to the optical axis as a function of the variation in the air space dB0. As depicted in FIG. 1, the relative position of lens group A and B provides an air space dB0 wherein the under-corrected spherical aberration introduced into the lens system by lens group A is offset by a spherical aberration of an over-correction which is provided by $r_B$ of the lens group B. The resulting transmitted image will experience a tolerable degree of spherical aberration as disclosed in FIG. 2a.

However, when the air space dB0 is widened beyond that of the normal air space in a corrected condition, then the height of a marginal ray that is incident on a point of the surface $r_B$ is reduced and there results a spherical aberration of under-correction as graphically shown in FIG. 3a. Conversely, if the air space is narrowed as compared with an air space dB0 in a normal corrected photographic condition, then there results a spherical aberration of over-correction as shown in FIG. 4a.

The following Tables 2, 3 and 4 provide a comparison of the aberration coefficient of the third degree for the embodiment of FIG. 1.

Table 2

| (Embodiment 1) Surface | Spherical Aberration | Coma | Astigmatism | Petzval Sum | Distortion |
|---|---|---|---|---|---|
| $r_{A1}$ | 2.7549 | 0.8614 | 0.2694 | 0.9559 | 0.3831 |
| $r_{A2}$ | 9.2468 | −4.6498 | 2.3381 | 0.2425 | −1.2977 |
| $r_{A3}$ | −14.2670 | 5.5915 | −2.1914 | −0.5786 | 1.0856 |
| $r_{A4}$ | −0.8957 | −0.6486 | −0.8814 | −0.9784 | |
| $r_{A5}$ | −0.0318 | 0.0708 | −0.1580 | −0.1882 | 0.7723 |
| $r_{A6}$ | 0.2025 | 0.1799 | 0.1599 | 0.0834 | 0.2161 |
| $r_{A7}$ | 23.7678 | 0.8952 | 0.0337 | 1.2573 | 0.0486 |
| $r_{B1}$ | −24.0272 | −1.6574 | −0.1143 | −1.3021 | −0.0977 |
| $r_{B2}$ | 4.2150 | −0.5804 | 0.0799 | 0.7111 | −0.1089 |
| Σ | 0.9654 | 0.0626 | −0.0524 | 0.3000 | 0.0231 |

Table 3

| (Embodiment 1) Surface | Spherical Aberration | Coma | Astigmatism | Petzval Sum | Distortion |
|---|---|---|---|---|---|
| $r_{B1}$ | −25.4576 | −1.6104 | −0.1019 | −1.3021 | −0.0888 |
| $r_{B2}$ | 4.3722 | −0.6083 | 0.0846 | 0.7111 | −0.1107 |
| Σ | −0.3079 | 0.0909 | −0.0332 | 0.3000 | 0.0306 |

Table 4

| | (Embodiment 1) | | | | |
|---|---|---|---|---|---|
| Surface | Spherical Aberration | Coma | Astigmatism | Petzval Sum | Distortion |
| $r_{B1}$ | −21.9910 | −1.7189 | −0.1344 | −1.3021 | −0.1123 |
| $r_{B2}$ | 3.98468 | −0.5389 | 0.0729 | 0.7111 | −0.1060 |
| Σ | 2.7712 | 0.0349 | −0.0812 | 0.3000 | 0.0111 |

In the above Table 2, the aberration coefficient of the third degree is disclosed for a normal condition when, $f$ equals 1.0 and dB0 equals 2.0. By contrast, Table 3 discloses the aberration coefficients of the third degree, when the spherical aberrations are under-corrected and dB0 equals 1.0. The values for the lens surfaces of the group A lenses are not repeated since they remain constant as set forth in Table 2 for the respective surfaces. The resultant sum of the aberration values are disclosed along with the variations in values for the group B lens surfaces. Table 4 likewise shows the aberration coefficient of the third degree when the spherical aberration is over-corrected and dB0 equals 3.5.

As is apparent from a comparison of the aberration coefficients of the third degree set forth in the above tables, a variation in dB0 leads to a wide range of variation in the spherical aberration, while the other aberrations of coma, astigmatism and distortion will remain substantially unchanged.

The design feature of this embodiment of the present invention wherein the surfaces $r_A$ and $r_B$ are concave toward the diaphragm or the point, S, on the optical axis, permits the introduction of desirable spherical aberration for soft focusing without introducing an undo amount of aberrations. The spherical aberration coefficients of the third degree as set forth in the tables for the surfaces $r_A$ and $r_B$ have considerably larger values. While not disclosed, it has been found that the spherical aberration coefficient of the seventh degree also varies over a large range due to a variation in dB0.

The invention embodiment shown in FIG. 1 discloses a lens group A consisting of four elements, i.e., of a tesser type. The following Table 5 shows a second embodiment of the present invention wherein the lens group A consists of three elements, i.e., of a triplet type.

Table 5

(Embodiment 1)
f=100.0  FNo.=2.8  2ω=28°  Back Focal Distance s'=77.14

| | Radius of Curvature | | Axial Distance | Refractive Index | Abbe Number |
|---|---|---|---|---|---|
| A | $r_{A1}$ | 53.949 | | | |
| | | | $d_{A1}$ 9.35 | $N_{A1}$ 1.744 | $\nu_{A1}$ 45.0 |
| | $r_{A2}$ | −127.131 | | | |
| | | | $d_{A2}$ 3.88 | | |
| | $r_{A3}$ | −58.048 | | | |
| | | | $d_{A3}$ 3.46 | $N_{A2}$ 1.6727 | $\nu_{A2}$ 32.2 |
| | $r_{A4}$ | 63.087 | | | |
| | | | $d_{A4}$ 14.69 (diaphragm) | | |
| | $r_{A5}$ | −689.355 | | | |
| | | | $d_{A5}$ 10.39 | $N_{A3}$ 1.6935 | $\nu_{A3}$ 53.4 |
| | $r_{A6}$ | −32.455 | | | |
| | | | $d_{B0}$ 2.06 (variable) | | |
| B | $r_{B1}$ | −29.946 | | | |
| | | | $d_{B1}$ 3.23 | $N_{B1}$ 1.61293 | $\nu_{B1}$ 37.0 |
| | $r_{B2}$ | −54.467 | | | |

Figure 5:
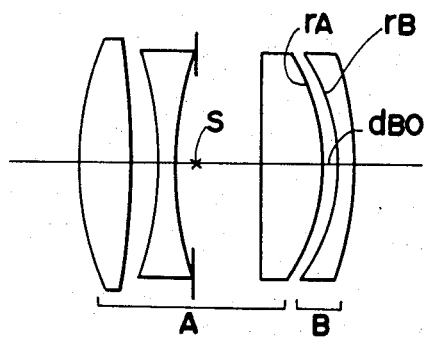
FIG. 5 is a schematic view of a second embodiment of the present invention.
Figure 6A:
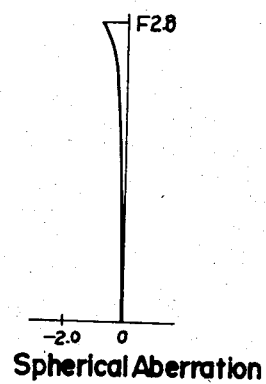
FIGS. 6a and 6b are graphical plots of the spherical aberration and astigmatism for normal photography.
Figure 6B:
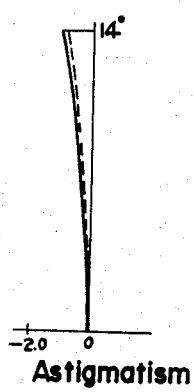

The second embodiment of Table 5, above, is schematically illustrated in FIG. 5. Again the introduction of a controlled amount of spherical aberration to produce the desired soft focusing effect by varying the meniscus air space dB0 is the same as discussed with respect to the embodiment of FIG. 1. FIGS. 6a and 6b disclose, respectively the spherical aberration and astigmatism for a normal photographic condition where the spherical aberration has been corrected to acceptable tolerance levels and dB0 is equal to 2.06.

Figure 7A:
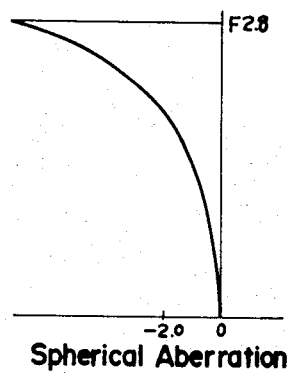
FIGS. 7a and 7b are graphical plots of the aberrations of the second embodiment for a soft focus condition.
Figure 7B:
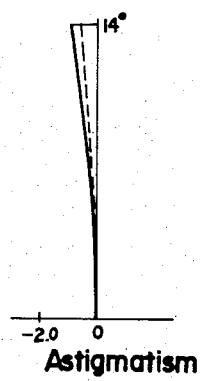

FIGS. 7a and 7b show respectively the spherical aberration and astigmatism for a soft focus condition wherein the spherical aberration has been over-corrected and dB0 equals 3.50.

In both the first and second embodiments of the present invention, focusing can be effected by the joint movement of both the lens groups A and B along the optical axis. Since the spherical aberration can be variably introduced into the transmitted image, the focusing on the subject can be best effected during a normal condition. After focusing has been accomplished, for example by focusing on the iris of a person in a portrait photograph, then the desired degree of soft focus effect can be introduced by varying the air space dB0.

In the embodiments disclosed in FIGS. 1 and 5, focusing is not generally a problem for relatively large object distances wherein the depth of the focus is relatively large. However, a problem can occur, resulting from the fact that both the lens group A and lens group B have refracting powers. As a result of the refracting powers, the focal lengths in the lens systems are different between a normal condition and a soft focus condition. That is, any movement of the lens groups relative to each other for focusing on a sharp object will change the total focal length of the lens system when there has been a relative movement for providing a soft focus condition. Thus the focus condition for a sharp normal photographic object will not be maintained in the soft condition when either one of the lens groups A or B are moved relative to the other to vary the width of the space dB0. Accordingly, in the first and second embodiment it is necessary to provide appropriate cam movements to adjust for focusing when it is desired to introduce a soft focus condition.

Figure 8:
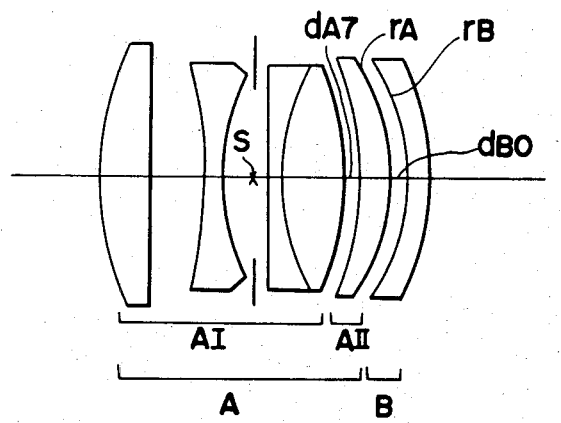
FIG. 8 is a schematic view of a third embodiment of the present invention.

Embodiment three is disclosed in FIG. 8 and the parameters of that lens system is set forth in the following Table:

Table 6

(Embodiment 3)
f=100.0  FNo.=2.8  2ω=28°  Back Focal Distance s'=66.90

| | | Radius of Curvature | | Axial Distance | Refractive Index | Abbe Number |
|---|---|---|---|---|---|---|
| A | $A_I$ | $r_{A1}$ | 47.717 | | | |
| | | | | $d_{A1}$ 8.64 | $N_{A1}$ 1.7495 | $\nu_{A1}$ 50.1 |
| | | $r_{A2}$ | 995.518 | | | |
| | | | | $d_{A2}$ 9.37 | | |
| | | $r_{A3}$ | −71.607 | | | |
| | | | | $d_{A3}$ 3.22 | $N_{A2}$ 1.6398 | $\nu_{A2}$ 34.7 |
| | | $r_{A4}$ | 35.967 | | | |
| | | | | $d_{A4}$ 7.39 (diaphragm) | | |
| | | $r_{A5}$ | 650.716 | | | |
| | | | | $d_{A5}$ 2.53 | $N_{A3}$ 1.54072 | $\nu_{A3}$ 46.8 |
| | | $r_{A6}$ | 35.711 | | | |
| | | | | $d_{A6}$ 10.69 | $N_{A4}$ 1.72 | $\nu_{A4}$ 52.1 |
| | | $r_{A7}$ | −54.216 | | | |
| | | | | $d_{A7}$ 2.76 (variable) | | |
| | $A_{II}$ | $r_{A8}$ | −49.647 | | | |
| | | | | $d_{A8}$ 5.78 | $N_{A5}$ 1.6968 | $\nu_{A5}$ 55.5 |
| | | $r_{A9}$ | −34.730 | | | |
| | | | | $d_{B0}$ 2.44 (variable) | | |
| B | | $r_{B1}$ | −31.559 | | | |
| | | | | $d_{B1}$ 3.22 | $N_{B1}$ 1.57616 | $\nu_{B1}$ 41.4 |
| | | $r_{B2}$ | −48.743 | | | |

In this third embodiment of the present invention there is provided two variable air spaces whereby focusing can be effectuated by widening or narrowing one of the variable air spaces while a controlled amount of spherical aberration for soft focusing can be introduced into the lens system by variation of the other variable air space. As can be seen from FIG. 8, the lens group A is divided into a pair of sub-lens group AI and AII with a variable air space dA7 separating them. During the focusing operation, the sub-group AII and the lens group B are maintained relatively stationary while the sub-group AI is shifted along the optical axis to thereby vary the width of the air space dA7. In this embodiment the variation of the air space dB0 will lead to minor variations in the focal length of the total lens system and accordingly during the introduction of the spherical aberration the lens group A and lens group B are both moved at different ratios along the optical axis to vary dB0 while compensating for any introduced variations of the focal length of the total system. In this particular design, the air space dA7 is maintained constant; and dB0 is varied for changing the soft focusing condition. Generally the lens groups A and B can be moved by means of a cam or the like as a function of the variation in dB0 to permit a focus condition to be accurately maintained during the shifting of a normal photographic condition to a soft focus condition.

As with the earlier embodiments, the two surfaces defining the meniscus shaped air space $^dA7$ are concave toward the diaphragm to minimize any variation in aberrations during focusing resulting from the shifting of the sub-lens group AI.

Figure 9A:
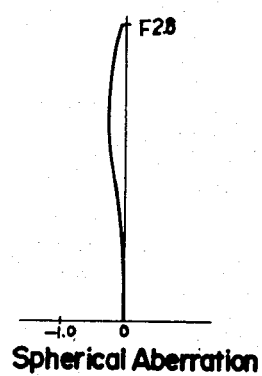
FIGS. 9a and 9b disclose the aberrations for normal photography.
Figure 9B:
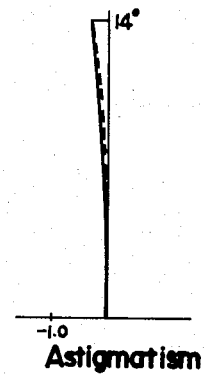

FIGS. 9a and 9b show respectively the spherical aberrations and astigmatisms when the lens system is focused at infinity during a normal photographic condition.

Figure 10A:
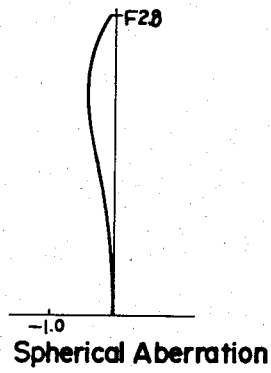
FIGS. 10a and 10b disclose the aberrations for normal photography.
Figure 10B:
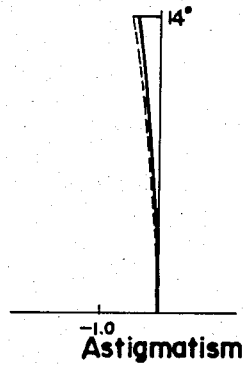

FIGS. 10a and 10b show the aberrations resulting when $^dA7$ equals 13.45 for focusing in a normal photographic condition (magnification of 0.11).

Figure 11A:
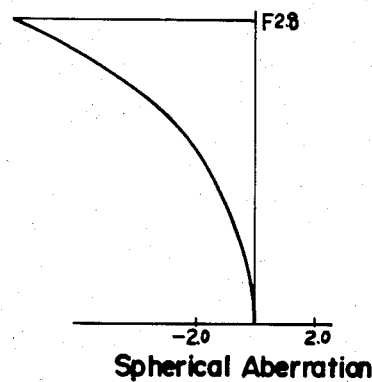
FIGS. 11a and 11b disclose the graphical aberrations of the soft focus.
Figure 11B:
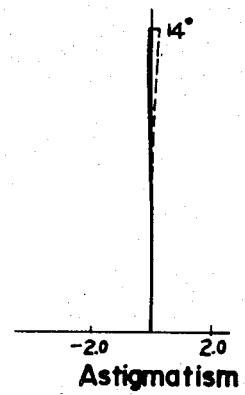

FIGS. 11a and 11b show the respective aberrations in a soft focusing condition when dB0 equals 8.19 and the lens system is still focused at infinity.

While the third embodiment discloses the lens group A divided into two separate sub-lens groups, it would be possible for the lens group B to be divided into two lens pieces with a variable air space for focusing provided therebetween to achieve the same results.

Figure 12:
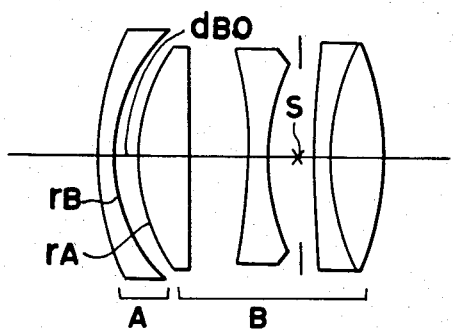
FIG. 12 is a schematic view of a fourth embodiment of the present invention.

Referring to the schematic illustration in FIG. 12, a fourth embodiment of the present invention is disclosed having the following parameters.

Table 7

(Embodiment 4)
f = 100.0 FNo. = 2.8 2ω = 28° Back Focal Distance s' = 81.14

| | Radius of Curvature | | Axial Distance | Refractive Index | Abbe Number |
|---|---|---|---|---|---|
| A | $r_{A1}$ | 47.290 | | | |
|   | $r_{A2}$ | 28.511 | $d_{A1}$ 2.80 | $N_{A1}$ 1.54072 | $\nu_{A1}$ 46.8 |
|   | | | $d_{B0}$ 3.61 | (variable) | |
|   | $r_{B1}$ | 30.513 | $d_{B1}$ 9.41 | $N_{B1}$ 1.6935 | $\nu_{B1}$ 53.4 |
|   | $r_{B2}$ | 454.215 | $d_{B2}$ 9.81 | | |
|   | $r_{B3}$ | −91.020 | $d_{B3}$ 2.80 | $N_{B2}$ 1.6398 | $\nu_{B2}$ 34.7 |
| B | $r_{B4}$ | 35.251 | $d_{B4}$ 8.60 | (diaphragm) | |
|   | $r_{B5}$ | 224.396 | $d_{B5}$ 2.20 | $N_{B3}$ 1.54072 | $\nu_{B3}$ 46.8 |
|   | $r_{B6}$ | 45.890 | $d_{B6}$ 9.20 | $N_{B4}$ 1.6968 | $\nu_{B4}$ 55.5 |
|   | $r_{B7}$ | −54.867 | | | |

Figure 13A:
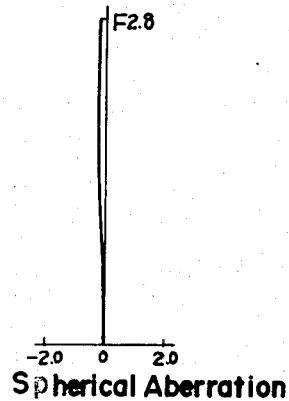
FIGS. 13a and 13b are graphical plots of the aberrations of the fourth embodiment.
Figure 13B:
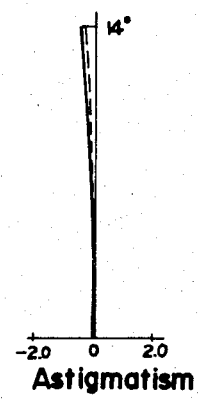

In this embodiment the variable air space dB0 is on the object side of the diaphragm. FIGS. 13a and 13b are plots of the aberrations for a normal photographic condition while FIGS. 14a and 14b are plots of the aberrations in a soft focus condition with dB0 equal to 8.61. Focusing of the lens system can be accomplished by a shifting of the lens groups along the optical axis similar to that disclosed with respect to the first and second embodiments.

In the above embodiments of the present invention, the variation in the meniscus shaped air space was accompanied by movement of the respective lens groups. In contrast to those embodiments, the following two embodiments described hereinafter will generally describe the movement of only a single lens group for varying the meniscus shaped air space. The following table sets forth the parameters of the fifth embodiment of the present invention.

Table 8

(Embodiment 5)
f = 100.0 FNo. = 2.8 2ω = 28° Back Focal Distance s' = 61.72

| | Radius of Curvature | | Axial Distance | Refractive Index | Abbe Number |
|---|---|---|---|---|---|
| A | $r_{A1}$ | 38.590 | $d_{A1}$ 10.309 | $N_{A1}$ 1.69680 | $\nu_{A1}$ 55.80 |
|   | $r_{A2}$ | −270.176 | | | |
|   | | | $d_{B0}$ 5.384 | (variable) | |
|   | $r_{B1}$ | −79.751 | $d_{B1}$ 3.421 | $N_{B1}$ 1.67270 | $\nu_{B1}$ 32.14 |
|   | $r_{B2}$ | 45.933 | $d_{B2}$ 14.405 | (diaphragm) | |
| B | $r_{B3}$ | −175.175 | $d_{B3}$ 2.247 | $N_{B2}$ 1.66892 | $\nu_{B2}$ 44.98 |
|   | $r_{B4}$ | 52.729 | $d_{B4}$ 12.989 | $N_{B3}$ 1.74400 | $\nu_{B3}$ 45.18 |
|   | $r_{B5}$ | −36.164 | | | |
|   | | | $d_{C0}$ 2.429 | (variable) | |
| C | $r_{C1}$ | −29.560 | $d_{C1}$ 2.281 | $N_{C1}$ 1.60565 | $\nu_{C1}$ 37.81 |
|   | $r_{C2}$ | −146.126 | | | |

FIG. 15 discloses a schematic view of the lens system defined in Table 8. In this embodiment of the present invention, the lens system is divided into three groups, i.e. Group A, B and C.

The variable meniscus shaped air space is shown at dC0 and is interposed between the lens group B and group C. While varying the air space dC0 to introduce the desired spherical aberration, the lens group A and lens group C will be maintained stationary while the lens group B alone will be moved along the optical axis. The movement of lens group B will lead to variation in the focal length of the total lens system, however accurate focusing can still be maintained during the shifting from a normal photographic condition to a soft focus condition at a specific object distance by the appropriate selection of the power distribution of the groups A, B and C. Focusing for the lens system can be effectuated by jointly shifting the lens group A, B and C forward while maintaining the relative positions of groups A, B and C stationary relative to each other. In this embodiment there may be a minor loss of focus when shifting from the normal photographic condition to the soft focus condition with respect to object distance other than a specific object distance. However, in the soft focus condition this is not a major problem because the spherical aberration will be large and the apparent depth of focus will also be large.

A further variation of this embodiment can be accomplished by subdividing the lens group A into a pair of sub-groups AI and AII. When focusing is effectuated by the shifting the sub-group AI, which is the lens group on the object side, then accurate focusing can be maintained during the shifting from a normal photographic condition to a soft focus condition irrespective of the desired object distance.

FIGS. 16a and 16b are plots showing aberrations in a normal photographic condition for the fifth embodiment. FIGS. 17a and 17b are graphical plots of aberrations in a soft focus condition where the lens group B has been moved so the dC0 equals 0.309. The sixth embodiment as with the fifth embodiment discloses a lens system which has been divided into three sub-groups, i.e., A, B and C. The parameters of this embodiment are set forth in the following Table.

Table 9

(Embodiment 6)
f = 100.0 FNo. = 2.8 2ω = 28° Back Focal Distance s' = 57.03

| | Radius of Curvature | | Axial Distance | Refractive Index | Abbe Number |
|---|---|---|---|---|---|
| A | $r_{A1}$ | 46.810 | $d_{A1}$ 10.246 | $N_{A1}$ 1.69680 | $\nu_{A1}$ 55.80 |
|   | $r_{A2}$ | −778.478 | | | |
|   | | | $d_{B0}$ 5.351 | (variable) | |
|   | $r_{B1}$ | −124.326 | $d_{B1}$ 3.400 | $N_{B1}$ 1.73300 | $\nu_{B1}$ 28.05 |
|   | $r_{B2}$ | 107.742 | $d_{B2}$ 14.316 | (diaphragm) | |
| B | $r_{B3}$ | −167.762 | $d_{B3}$ 2.234 | $N_{B2}$ 1.56994 | $\nu_{B2}$ 48.04 |
|   | $r_{B4}$ | 93.355 | $d_{B4}$ 12.909 | $N_{B3}$ 1.74400 | $\nu_{B3}$ 45.18 |
|   | $r_{B5}$ | −36.114 | | | |
|   | | | $d_{C0}$ 2.414 | (variable) | |
| C | $r_{C1}$ | −29.227 | $d_{C1}$ 2.266 | $N_{C1}$ 1.60565 | $\nu_{C1}$ 37.81 |
|   | $r_{C2}$ | −78.779 | | | |

In this embodiment a pair of variable air spaces are provided and the air space dC0 is utilized for the controlled introduction of spherical aberration. During the variation of dC0, the lens group A and C are both jointly moved along the optical axis without changing their relative position and group B is maintained stationary. Focusing again can be effectuated in a manner similar to that disclosed in the fifth embodiment. FIG. 18 sets forth a schematic view of the sixth embodiment.

FIGS. 19a and 19b respectfully set forth the aberrations for a normal photographic condition. FIGS. 20a and 20b set forth the aberrations for soft focus condition wherein the lens groups A and C are moved 2.12 toward the image side.

FIG. 21 discloses a schematic view of the seventh embodiment of the present invention and the parameters of this embodiment are set forth in the following Table:

Table 10

(Embodiment 7)
f=100.0  FNo.=2.8  2ω=28°  Back Focal Distance s'=75.81

| | Radius of Curvature | | Axial Distance | Refractive Index | Abbe Number |
|---|---|---|---|---|---|
| A | $r_{A1}$ | 56.042 | | | |
| | | | $d_{A1}$ 2.87 | $N_{A1}$ 1.51763 | $\nu_{A1}$ 53.5 |
| | $r_{A2}$ | 33.003 | | | |
| | | | $d_{B0}$ 1.94 (variable) | | |
| B | $r_{B1}$ | 34.307 | | | |
| | | | $d_{B1}$ 11.49 | $N_{B1}$ 1.7495 | $\nu_{B1}$ 50.1 |
| | $r_{B2}$ | −164.565 | | | |
| | | | $d_{B2}$ 6.77 | | |
| | $r_{B3}$ | −51.431 | | | |
| | | | $d_{B3}$ 3.45 | $N_{B2}$ 1.6727 | $\nu_{B2}$ 32.2 |
| | $r_{B4}$ | 42.488 | | | |
| | | | $d_{B4}$ 12.41 (diaphragm) | | |
| | $r_{B5}$ | −2815.49 | | | |
| | | | $d_{B5}$ 8.62 | $N_{B3}$ 1.6779 | $\nu_{B3}$ 55.4 |
| | $r_{B6}$ | −33.939 | | | |
| | | | $d_{C0}$ 1.21 (variable) | | |
| C | $r_{C1}$ | −33.425 | | | |
| | | | $d_{C1}$ 2.83 | $N_{C1}$ 1.54072 | $\nu_{C1}$ 46.8 |
| | $r_{C2}$ | −45.530 | | | |

As can be seen from the above Table 10, a pair of variable air spaces are provided and they can be used for varying the introduction of spherical aberration. If it is desired in the seventh embodiment to maintain a focus condition upon the variation of dB0 and dC0, then the three lens groups A, B and C can be moved separately. However, if the variations of dB0 and dC0 are suitably selected, it is possible that one group of the three groups, A, B and C can be held stationary. FIGS. 22a and 22b disclose respectively the aberrations for a normal photographic condition while FIGS. 23a and 23b disclose the aberrations in a soft focus condition when dB0 equals 6.83 and dC0 equals 5.60.

In achieving these respective air space values, the lens group A can be held stationary while the lens groups B and C are moved. Similar to the second embodiment, by placing the respective meniscus shaped air spaces on either side of the diaphragm with their concave curved surfaces directed toward the diaphragm, it is possible to both vary the spherical aberration while varying these air spaces and maintain a good symmetrical condition for off-axial aberrations. The eighth embodiment of the present invention is disclosed in FIG. 24 and in the following Table:

Table 11

(Embodiment 8)
f=100.0 FNo.=2.8 2ω=2.8 Back Focal Distance s'=68.94

| | Radius of Curvature | | Axial Distance | Refractive Index | Abbe Number |
|---|---|---|---|---|---|
| A | $r_{A1}$ | 55.775 | | | |
| | | | $d_{A1}$ 12.435 | $N_{A1}$ 1.74950 | $\nu_{A1}$ 50.41 |
| | $r_{A2}$ | −51.398 | | | |
| | | | $d_{A2}$ 1.225 | $N_{A2}$ 1.66892 | $\nu_{A2}$ 44.98 |
| | $r_{A3}$ | 251.311 | | | |
| | | | $d_{A3}$ 3.353 (variable) | | |
| | $r_{A4}$ | −234.001 | | | |
| | | | $d_{A4}$ 3.528 | $N_{A3}$ 1.73300 | $\nu_{A3}$ 28.05 |
| | $r_{A5}$ | 224.231 | | | |
| | | | $d_{B0}$ 8.976 (variable; diaphragm) | | |
| B | $r_{B1}$ | −41.506 | | | |
| | | | $d_{B1}$ 2.318 | $N_{B1}$ 1.57616 | $\nu_{B1}$ 41.40 |
| | $r_{B2}$ | 392.782 | | | |
| | | | $d_{B2}$ 13.395 | $N_{B2}$ 1.77250 | $\nu_{B2}$ 50.09 |
| | $r_{B3}$ | −33.043 | | | |
| | | | $d_{C0}$ 2.493 | | |
| C | $r_{C1}$ | −27.036 | | | |
| | | | $d_{C1}$ 2.352 | $N_{C1}$ 1.60565 | $\nu_{C1}$ 37.81 |

Table 11-continued (Embodiment 8)
f=100.0 FNo.=2.8 2ω=2.8 Back Focal Distance s'=68.94

| Radius of Curvature | Axial Distance | Refractive Index | Abbe Number |
|---|---|---|---|
| $r_{C2}$ −39.938 | | | |

Figure 26A:
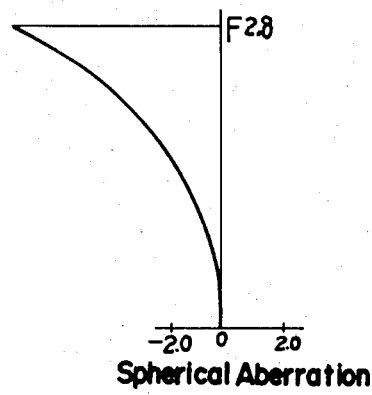
FIGS. 26a and 26b are graphical plots of aberrations of the eighth embodiment.
Figure 26B:
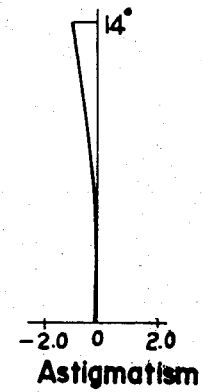

In the eighth embodiment, FIG. 24, the lens system is divided into three groups; A, B and C. A pair of variable air spaces dC0 and dB0 are provided for varying the spherical aberration. When it is desired to introduce the spherical aberration, the lens groups A, B and C move along the optical axis at different rates thereby maintaining the focus condition and a constant focal length of the lens system. The variation of the width of the air space dB0 contributes to maintaining the focal length of the lens system constant to compensate for the variation in the width of the space dC0. During the focusing operation, the lens groups A, B and C are shifted forward jointly with the relative positions of A, B and C being maintained with respect to each other. Thus, if the spherical aberration is varied to produce the soft focusing condition, the focal length may be maintained constant so that any shifting of the lenses in the lens system both in the normal condition and in the soft condition would coincide with each other regardless of the object distance so that focusing may be effected accurately. FIGS. 25a and 25b are plots of aberrations in the normal photographic condition. FIGS. 26a and 26b are plots of aberrations in the soft focusing condition when dB0 equals 14.86 and dC0 equals 4.71.

Figure 27:
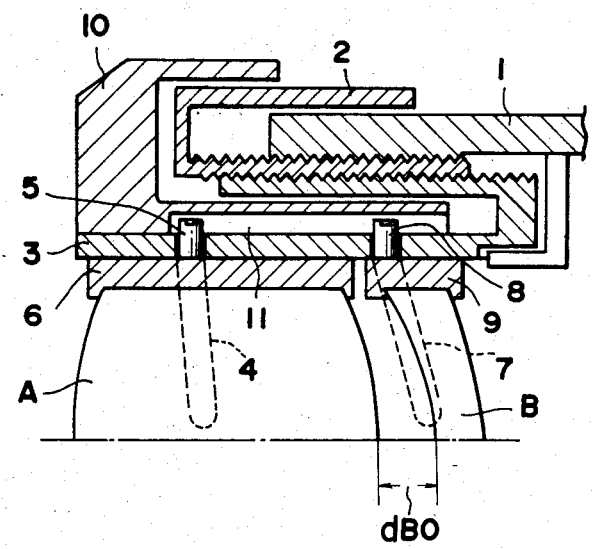
FIG. 27 is a half cross-sectional view of a lens barrel and mechanism for shifting the lens groups in any one of the first, second and fifth to eighth embodiments of the present invention.

Referring to FIG. 27, a half cross-sectional view of a lens barrel mechanism for moving the lenses according to the present invention is disclosed. This lens barrel mechanism can be utilized for the lens system of embodiment 1 described above. A fixed cylinder 1 is helically grooved to receive a focusing ring 2. The focusing ring 2 is in turn helically grooved to mesh with a cam cylinder 3. Thus the cam cylinder 3 can move linearly along the optical axis through the medium of the double helicoid and a linearly advancing key mechanism during the rotation of the focusing ring 2. The lens group A in the lens system is retained by the first inner cylinder 6 that further supports a pin 5 inserted into a cam slot 4 for controlling the relative movement of the lens group A. The second lens group B is retained by the second inner cylinder 9 having a pin or follower 8 fitted into the cam slot 7 provided in the cam cylinder 3. Thus the rotation of the focus ring 2 causes the lens group A and B to shift forward jointly. A soft focus control ring 10 is rotated for varying the spherical aberration. A groove 11, parallel with the optical axis, is provided on the inner surface of the soft focus control or aberration variable ring 10 with the respective pins 5 and 8 inserted therein, so that the first inner cylinder 6 and the second inner cylinder 9 are rotated when the ring 10 is rotated.

Thus, the lens groups A and B will move along the optical axis relative to the cam cylinder 3 when they are tracked in the cam slots 4 and 7. The relative difference in shifting of the lens groups A and B can be compensated for while dB0 is varied.

As can be appreciated, the mechanical camming mechanism principles disclosed in FIG. 27 may be equally applied to the embodiments 2, 4, 5, 6, 7, and 8. Obviously the number of lens groups in any one particular embodiment may require an increased number of cam cylinders, cam slots and inner cylinders. Also as can be appreciated, if there is a lens group which need not be moved relative to a cam cylinder, that lens group may be directly retained by the cam cylinder.

Figure 28:
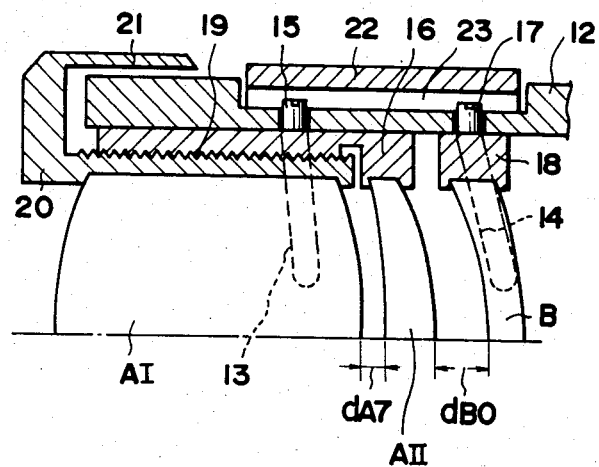
FIG. 28 is a half cross-sectional view of a lens barrel and mechanism for shifting the lens group disclosed in the third embodiment.

The third embodiment of the invention can utilize a camming mechanism disclosed in FIG. 28. A fixed cylinder 12 is provided with cam slots 13 and 14. The lens sub-group AII is retained by a first inner cylinder 16 having a pin or follower 15 inserted in the cam slot 13. While the lens group B can be retained by a second inner cylinder 18 having a pin 17 inserted in the cam slot 14. The other sub-lens group AI in the lens system is retained by a third inner cylinder 20 fitted in the first inner cylinder 16 by means of a helicoid 19 and adapted to be rotated by the means of a focusing ring 21. Accordingly, when the focusing ring 21 is rotated, then the sub-group AI alone will be shifted forward so that the air space $^dA7$ will be varied.

When it is desired to vary the spherical aberration introduced into the line system, then the aberration variable ring 22 can be rotated. The groove 23 which is parallel with the optical axis can be provided on the inner surface of the aberration variable ring 22 to receive the fitted pins 15 and 17. The rotation of the aberration variable ring 22 will cause the first inner cylinder and second inner cylinder to rotate following the cam slots 13 and 14 so that the air space dB0 will be varied. At the same time the sub-lens groups AI and AII will be jointly moved while maintaining the air space $^dA7$ constant.

Figure 29:
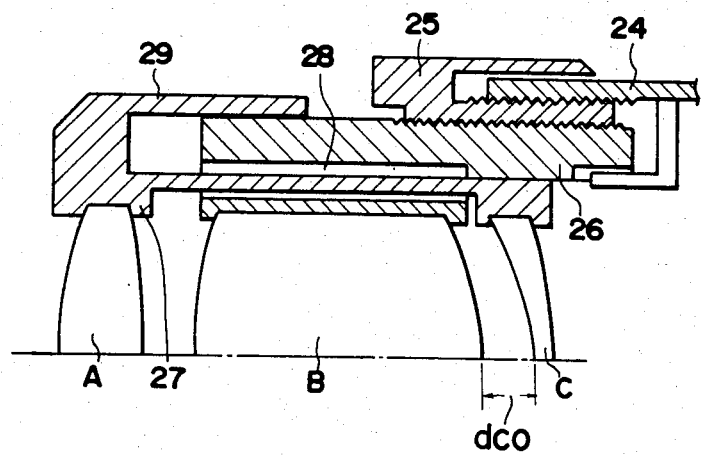
FIG. 29 is a half cross-sectional view of a lens barrel and mechanism for shifting the lens group of the sixth embodiment.

Another example of a camming mechanism that is particularly applicable to the sixth embodiment of the present invention is disclosed in FIG. 29. A fixed cylinder 24 supports a focusing ring 25 that is capable of jointly shifting the lens groups A, B and C through the medium of a double helicoid and a linear advancing mechanism. A first inner cylinder 26 mounts the lens group B while a second inner cylinder 27 mounts the lens groups A and C. The second inner cylinder 27 extends through a slot or hole 28 in the first inner cylinder 26 to permit an integral movement of the lens groups A and C. The second inner cylinder 27 is also slideable along the optical axis relative to the first inner cylinder 26. Accordingly, when the soft focus or aberration variable ring 29 is moved along the optical axis, the air space dC0 can be varied to introduce a controlled amount of spherical aberration.

Figure 34:
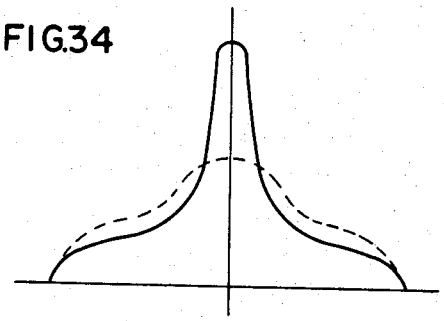
FIG. 34 is a graphical plot of the distribution of light rays forming a soft focus image of a point in both the ninth embodiment of the present invention and the reference embodiment.

As can be seen in FIG. 34, a satisfactory soft tone or focused picture can be attained when an image of a point object is formed by a finely focused nucleus with an appropriate flare surrounding the same. The soft focused lens design set forth in the embodiments of the present invention is particularly adapted for providing a high quality soft tone picture. As a result of the design features of the present invention, a light ray pencil incident on a lens system parallel with the optical axis will be convergent in the meniscus-shaped air space such as defined by the refracting surfaces $r_A$ and $r_B$ of FIG. 1. The height from the optical axis to the incident point of the light ray as it passes through the refracting surface $r_A$ and the refracting surface $r_B$ will be different. By further varying this relative difference, it is possible to increase the amount of high degree coefficients of spherical aberration that is introduced into the lens system. Thus, it is possible to control the formation of an ideal soft tone picture in a relatively economical and efficient manner.

It should be recognized that the broader principles of the present invention can also be utilized in not only a variable soft focus lens system, but also in a stationary or nonvariable soft focus lens system. In the latter embodiments, the width of the meniscus-shaped air space will be fixed at an optimum shape to insure the maximum soft focus tone to the transmitted image. A nonvariable soft focus lens system will also simplify the lens barrel mechanism.

The ninth embodiment of the present invention disclosed in FIG. 30 is of a nonvariable soft focus lens system. The design parameters of the ninth embodiment are similar to that of the first embodiment although some modifications are incorporated therein. The width of the meniscus-shaped air space is fixed at an optimum size to introduce the appropriate amount of spherical aberration. The parameters of this embodiment are set forth in the following tables:

Table 12

| (Embodiment 9) $f=100.0$ FNo.=2.5 $2\omega=28°$ Back Focal Distance $s'=60.17$ | | | |
|---|---|---|---|
| Radius of Curvature | Axial Distance | Refractive Index | Abbe Number |
| $r_1 = 45.273$ | | | |
| | $d_1 = 11.25$ | $N_1 = 1.6986$ | $\nu_1 = 55.8$ |
| $r_2 = -163.381$ | | | |
| | $d_2 = 3.36$ | | |
| $r_3 = -85.294$ | | | |
| | $d_3 = 4.03$ | $N_2 = 1.733$ | $\nu_2 = 28.1$ |
| $r_4 = 89.473$ | | | |
| | $d_4 = 14.86$ | | |
| $r_5 = -121.348$ | | | |
| | $d_5 = 2.94$ | $N_3 = 1.5699$ | $\nu_3 = 48.0$ |
| $r_6 = 106.513$ | | | |
| | $d_6 = 13.94$ | $N_4 = 1.744$ | $\nu_4 = 45.2$ |
| $r_7 = -34.652$ | | | |
| | $d_7 = 4.71$ | | |
| $r_8 = -28.149$ | | | |
| | $d_8 = 2.40$ | $N_5 = 1.6057$ | $\nu_5 = 37.8$ |
| $r_9 = -73.488$ | | | |

Table 13

| Surface | (Embodiment 9) | | | | | |
|---|---|---|---|---|---|---|
| | I | II | III | P | V | I* |
| $r_1$ | 2.608 | 0.651 | 0.163 | 0.907 | 0.267 | 28.935 |
| $r_2$ | 7.612 | −4.413 | 2.559 | 0.251 | −1.629 | 244.346 |
| $r_3$ | −10.653 | 5.308 | −2.644 | −0.496 | 1.565 | −330.808 |
| $r_4$ | 0.015 | 0.050 | 0.174 | −0.473 | −1.031 | 0.287 |
| $r_5$ | −0.437 | 0.439 | −0.440 | −0.299 | 0.742 | −4.499 |
| $r_6$ | 0.012 | 0.025 | 0.042 | 0.060 | 0.189 | 0.274 |
| $r_7$ | 17.312 | 0.410 | 0.010 | 1.231 | 0.029 | 805.567 |
| $r_8$ | −15.618 | −1.551 | −0.154 | −1.340 | −0.148 | −672.255 |
| $r_9$ | 1.601 | −0.578 | 0.209 | 0.513 | −0.261 | 25.416 |
| Σ | 2.450 | 0.339 | −0.083 | 0.355 | −0.278 | 97.262 |

Table 13 above shows the coefficient of various aberrations. These aberrations are graphically plotted respectively in FIGS. 31a, 31b, 31c and 31d. The values of these aberration coefficients are for the third degree and in the above Table 13 I, refers to spherical aberrations; II is the coma; P is Petzval sum; and V is the distortion coefficient. Finally, I*, represents the coefficient of spherical aberration for the fifth degree. The symbols, r, represent respective values of coefficients of aberrations for consecutive surfaces from the object to image side of FIG. 30. The summation, Σ, of these coefficients can be found on the botton line of Table 13.

Figure 32:
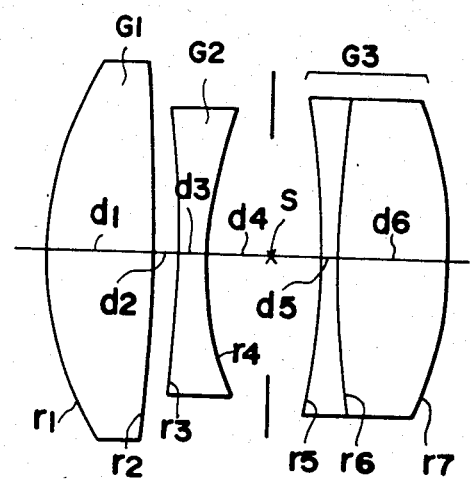
FIG. 32 is a cross-sectional view of a reference lens system to illustrate the advantages of the present invention.

In the interest of providing an appreciation of the design parameters of the present invention, an illustrative reference lens system is disclosed in FIG. 32. The parameters of this reference embodiment are set forth in Table 14 and the coefficients of various aberrations are set forth in the following Table 15.

Table 14

(Reference Embodiment)

$f = 100.0$  FNo. $= 2.5$  $2\omega = 28°$  Back Focal Distance $s' = 74.22$

| Radius of Curvature | Axial Distance | Refractive Index | Abbe Number |
|---|---|---|---|
| $r_1 = 46.679$ | | | |
| | $d_1 = 14.12$ | $N_1 = 1.6968$ | $\nu_1 = 55.8$ |
| $r_2 = -264.854$ | | | |
| | $d_2 = 3.36$ | | |
| $r_3 = -153.633$ | | | |
| | $d_3 = 4.03$ | $N_2 = 1.733$ | $\nu_2 = 28.1$ |
| $r_4 = 56.919$ | | | |
| | $d_4 = 14.86$ | | |
| $r_5 = -108.341$ | | | |
| | $d_5 = 2.94$ | $N_3 = 1.5699$ | $\nu_3 = 48.0$ |
| $r_6 = 241.114$ | | | |
| | $d_6 = 13.94$ | $N_4 = 1.744$ | $\nu_4 = 45.2$ |
| $r_7 = -54.336$ | | | |

Table 15

(Reference Embodiment)

| Surface | I | II | III | P | V | I* |
|---|---|---|---|---|---|---|
| $r_1$ | 2.379 | 0.544 | 0.124 | 0.880 | 0.229 | 24.833 |
| $r_2$ | 4.451 | −3.112 | 2.176 | 0.155 | −1.630 | 121.878 |
| $r_3$ | −5.324 | 3.399 | −2.170 | 0.275 | 1.561 | −139.858 |
| $r_4$ | −0.111 | −0.126 | −0.143 | −0.743 | −1.005 | 0.217 |
| $r_5$ | −0.258 | 0.298 | −0.344 | −0.335 | 0.784 | − 4.173 |
| $r_6$ | 0.005 | 0.014 | 0.037 | 0.026 | 0.170 | − 0.062 |
| $r_7$ | 4.176 | −0.814 | 0.159 | 0.785 | −0.184 | 83.924 |
| Σ | 5.318 | 0.203 | −0.161 | 0.493 | −0.074 | 86.759 |

The referenced embodiment provides a lens system of the tesser type and does not contain a meniscus-shaped air space. The lens has been designed, however, to introduce spherical aberration so that the aberration of a marginal ray will be equal to that of the ninth embodiment for purposes of comparison.

Figure 33:
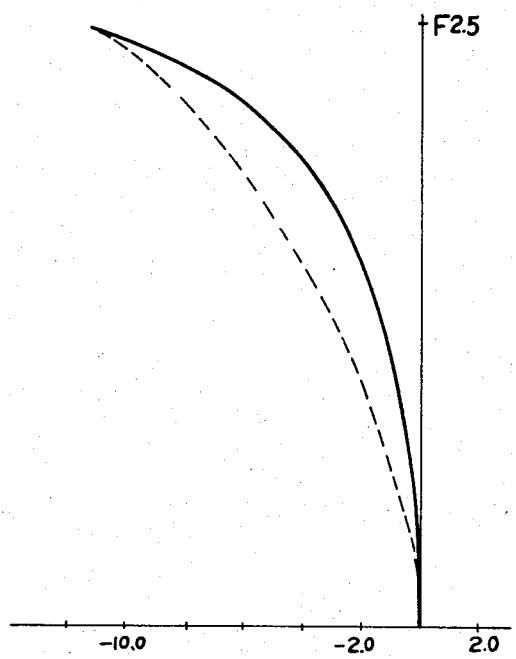
FIG. 33 is a graphical plot of the spherical aberration of both the ninth embodiment of the present invention and the reference embodiment.

FIG. 33 is a plot comparing the conditions of the spherical aberration introduced into the transmitted image by respectively the ninth embodiment (solid line) and the reference embodiment (broken line). As can be appreciated from FIG. 33, the aberrations of the marginal rays at a full open aperture are equal to each other but that the aberrations of a zonal ray in the ninth embodiment will be smaller than that of the referenced embodiment. The result of having relatively less spherical aberration introduced in the zonal ray signifies that the zonal ray contributes to the formation of a nucleus for an image of a point object. Referring specifically to FIG. 34, a graphical plot of the distribution of light rays forming a soft focus image of a point object is disclosed. The solid line refers again to the ninth embodiment while the broken line refers to the referenced embodiment.

Since the aberrations in the zonal rays of the ninth embodiment is small, the distribution of light rays particularly peaks at the center of an image, as graphically disclosed by the solid line, thereby enabling the formation of a finely focused nucleus. The light rays distributed along the periphery of an image will provide a pleasing flare effect to produce an ideal soft focus point image. Additionally, any focusing is facilitated due to the formation of the finally focused nucleus in the present invention.

As can be seen from the graphical plot of the referenced embodiment an excessively wide range of distribution of light rays around the periphery of the image nucleus is disclosed and detracts from the formation of a satisfactory nucleus. Thus, the image of a point object will be entirely blurred with additional problems resulting during any focusing operation.

Figure 35:
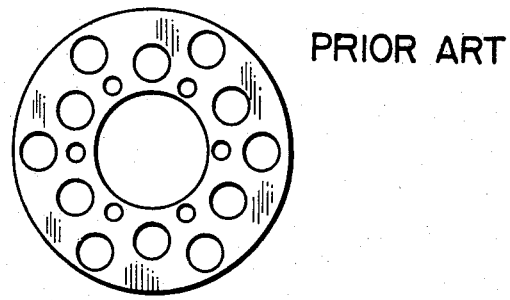
FIG. 35 is a plan view of a softness control plate of the prior art.

The prior art has attempted to solve this problem by providing various apodization techniques such as a softness control plate inserted into the lens system to cut off a portion of the zonal and marginal rays to weaken the flare. An illustration of a prior art control plate is disclosed in FIG. 35. Obviously, the softness control plate sacrifices some of the intensity of the light transmitted and further when taking a picture of an object of high brightness there is an additional disadvantage in that images of the holes in the softness control plate can even appear in the picture photograph. As can be appreciated, the embodiments of the present invention do not require a softness control plate yet are still capable of formation of an ideal distribution of light rays to form a soft focused image of a point object.

The advantages of the present invention can be further seen by a comparison of the coefficients of aberrations for the ninth embodiment of the present invention set forth in Table 13 with the reference embodiment set forth in Table 15.

In this comparison the sum of the spherical aberration coefficients of the third degree, $\Sigma I$ are compared as a ratio with the sum of the spherical aberration coefficients of the fifth degree, $\Sigma I^*$;

Ninth embodiment;

$\Sigma I = 2.45$ $\Sigma I^* = 97.26$ $$\frac{\Sigma I^*}{\Sigma I} = 39.7$$

Referenced embodiment;

$\Sigma I = 5.32$ $\Sigma I^* = 86.76$ $$\frac{\Sigma I^*}{\Sigma I} = 16.3$$

As can be determined, a larger ratio for the sum of the spherical aberration coefficients of the fifth degree to the sum of the spherical aberration coefficients of the third degree is obtained from the ninth embodiment as compared with the referenced embodiment. Thus, the design parameters of the ninth embodiment permit a larger degree of influence of the spherical aberration of the fifth degree than the referenced embodiment. Therefore, in terms of the same amount of spherical aberration from marginal rays, the ninth embodiment of the present invention will have less spherical aberration for a zonal ray as compared with the referenced embodiment. It has been found that it is highly desirable in maximizing the desirable effects of a soft focused tone picture to maintain a balance of the aberrations for marginal ray relative to the aberration for a zonal ray as follows:

$$\Sigma I^*/\Sigma I > 20$$

The use of the particular meniscus-shaped air space lens of the present invention helps establish this desirable relationship.

In addition, the present invention recognizes additional parameters associated with the radii of curvature of the refracting surfaces and the focal length of the lens system. Thus, the radii of curvature of the absolute value of the refracting surfaces $r_A$ and $r_B$ forming the meniscus-shaped air space should be selected within the following range wherein $f$ represents the focal length of the lens system:

$$0.20 < \frac{|r_A|}{f} < 0.65 \quad (1)$$

$$0.18 < \frac{|r_B|}{f} < 0.45 \quad (2)$$

The above equations 1 and 2 are necessary to compensate for other aberrations while still permitting the introduction of spherical aberrations with a proper balance between the marginal rays and the zonal rays. In equation 1, when $r_A$ approaches the upper limit of the range, the refracting power of the refracting surface $r_A$ will be lessened and the spherical aberration values of the higher degree will be reduced. At the other end of the range, the positive refracting power of the refracting surface $r_A$ will be relatively strong and the spherical aberration coefficient of the third degree will be increased and will tend to upset the balance of the spherical aberration coefficients of the third and fifth degrees. The limits set forth in equation 1 define acceptable parameters although a preferred embodiment would most likely not have a value at either end of the range.

Equation 2 provides parameters necessary to maintain the coma and flatness of an image plane within acceptable tolerances. When the value approaches the upper limit, there will be a tendency for the Petzval sum to be increased and the flatness of the image plane to be impaired. When the value of equation 2 approaches the lower limit, then coma will become positive and symmetry of the aberration will be lost.

Figure 36:
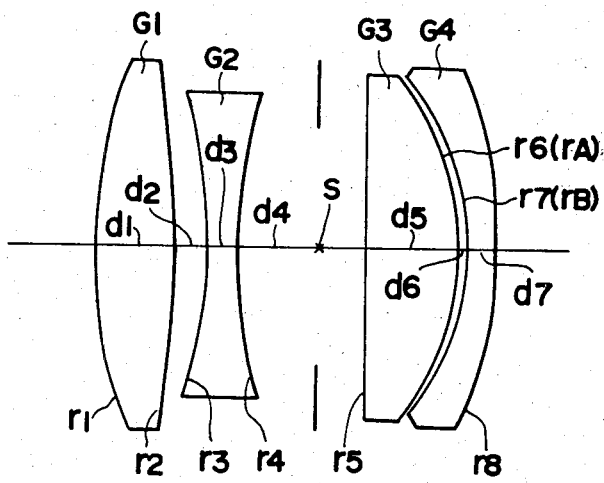
FIG. 36 is a schematic view of the tenth embodiment of the present invention.
Figure 37A:
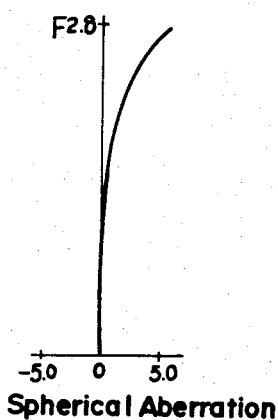
FIGS. 37a, 37b 37c and 37d are graphical plots of aberrations of the tenth embodiment.
Figure 37B:
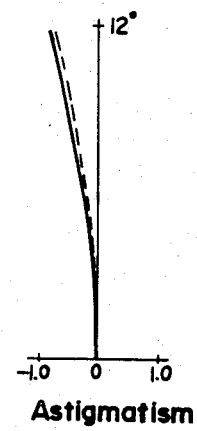
Figure 37C:
Figure 37D:
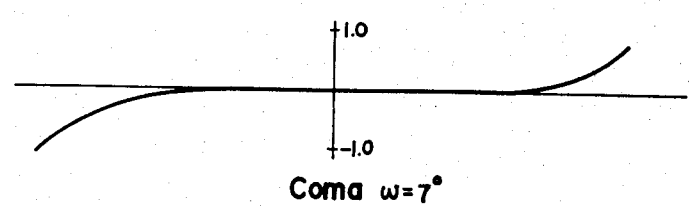

The following embodiments are directed to nonvariable soft focus lens systems wherein the positional relationship of the lens elements are fixed and the lens barrel mechanism is relatively simplified. The tenth embodiment is disclosed in FIG. 36 and its parameters are set forth in Table 16. The tenth embodiment is somewhat of a modification of the second embodiment. FIGS. 37a, 37b, 37c and 37d disclose the graphical plots of the aberrations.

Table 16

(Embodiment 10)
f=100.0 FNo.=2.8 2ω=24° Back Focal Distance s'=80.86

| Radius of Curvature | Axial Distance | Refractive Index | Abbe Number |
|---|---|---|---|
| $r_1$ = 53.079 | | | |
| | $d_1$ = 9.20 | $N_1$ = 1.744 | $\nu_1$ = 45.2 |
| $r_2$ = −125.080 | | | |
| | $d_2$ = 3.82 | | |
| $r_3$ = −57.112 | | | |
| | $d_3$ = 3.41 | $N_2$ = 1.6727 | $\nu_2$ = 32.2 |
| $r_4$ = 62.069 | | | |
| | $d_4$ = 14.45 | | |
| $r_5$ = −678.238 | | | |
| | $d_5$ = 10.22 | $N_3$ = 1.6935 | $\nu_3$ = 53.4 |
| $r_6$ = −31.931 | | | |
| | $d_6$ = 0.98 | | |
| $r_7$ = −29.463 | | | |
| | $d_7$ = 3.18 | $N_4$ = 1.6129 | $\nu_4$ = 37.0 |
| $r_8$ = −53.589 | | | |

($\Sigma I/\Sigma I$ = 24.0)

Figure 38:
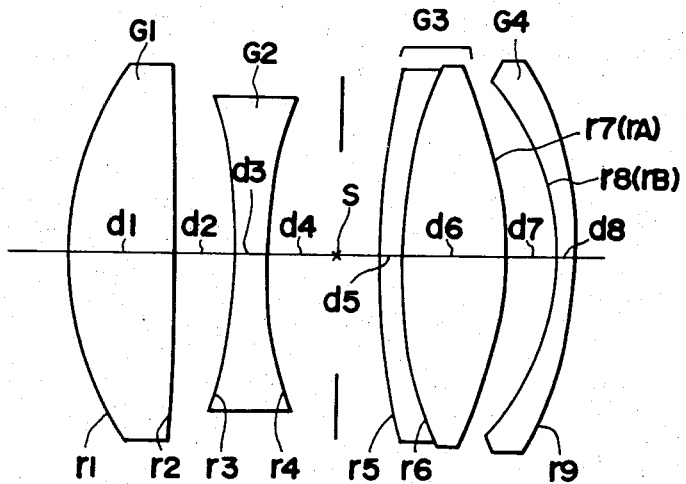
FIG. 38 is a schematic view of an eleventh embodiment of the present invention.
Figure 39A:
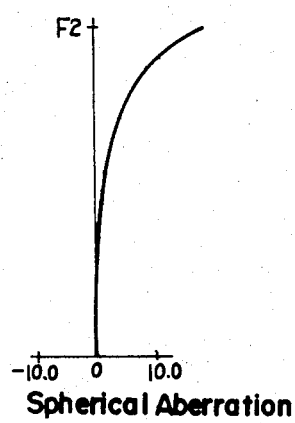
FIGS. 39a, 39b, 39c and 39d are graphical plots of aberrations of the eleventh embodiment.
Figure 39B:
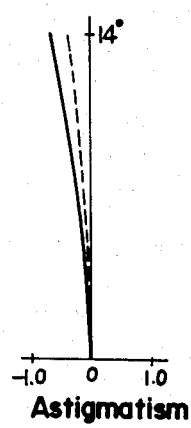
Figure 39C:
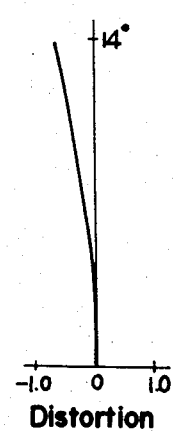
Figure 39D:
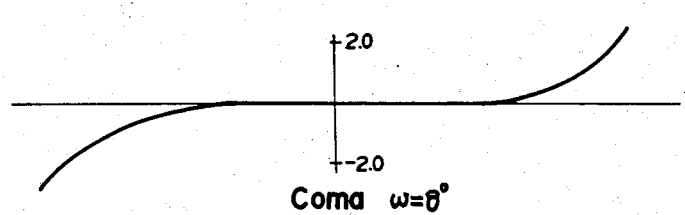

The eleventh embodiment is disclosed in FIG. 38 and the design parameters are disclosed in Table 17. FIGS. 39a, 39b, 39c and 39d are the graphical plots of aberrations. The eleventh embodiment is a further modification of the ninth embodiment. Both the tenth and eleventh embodiments introduce spherical aberrations that provide an over-correction. This is particularly advantageous to introduce an artistic blur of a background of the object. Conversely, if it is desired to have an artistic blur of the foreground, a spherical aberration should be under-corrected.

Table 17

(Embodiment 11)
f=100.0 FNo.=2.04 2ω=28° Back Focal Distance s'=59.16

| Radius of Curvature | Axial Distance | Refractive Index | Abbe Number |
|---|---|---|---|
| $r_1$ = 45.373 | | | |
| | $d_1$ = 14.12 | $N_1$ = 1.6968 | $\nu_1$ = 55.8 |
| $r_2$ = −1346.269 | | | |
| | $d_2$ = 8.24 | | |
| $r_3$ = −69.370 | | | |
| | $d_3$ = 4.03 | $N_2$ = 1.733 | $\nu_2$ = 28.1 |
| $r_4$ = 60.540 | | | |
| | $d_4$ = 14.86 | | |
| $r_5$ = 115.012 | | | |
| | $d_5$ = 2.94 | $N_3$ = 1.5699 | $\nu_3$ = 48.0 |
| $r_6$ = 65.967 | | | |
| | $d_6$ = 13.94 | $N_4$ = 1.744 | $\nu_4$ = 45.2 |
| $r_7$ = −58.810 | | | |
| | $d_7$ = 7.06 | | |
| $r_8$ = −34.756 | | | |
| | $d_8$ = 2.40 | $N_5$ = 1.6057 | $\nu_5$ = 37.8 |
| $r_9$ = −52.214 | | | |

($\Sigma I^*/\Sigma I$ = 86.7)

Figure 40:
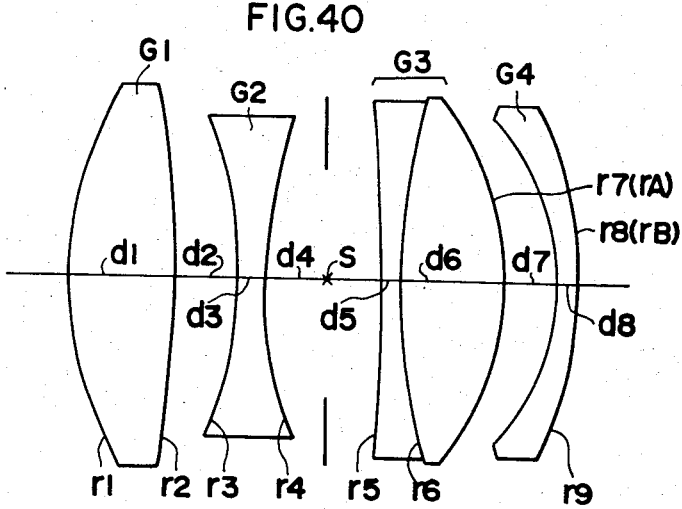
FIG. 40 is a schematic view of the twelfth embodiment of the present invention.
Figure 41A:
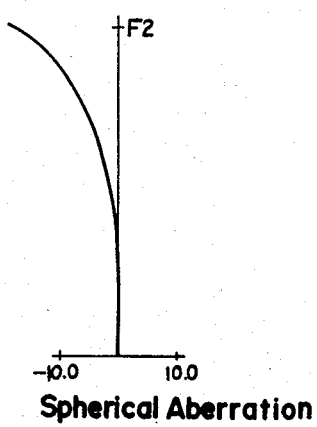
FIGS. 41a, 41b, 41c and 41d are graphical plots of aberrations of the twelfth embodiment.
Figure 41B:
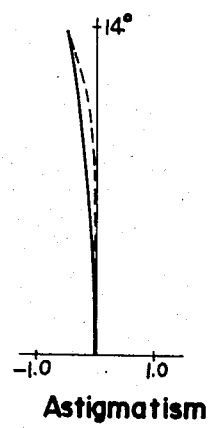
Figure 41C:
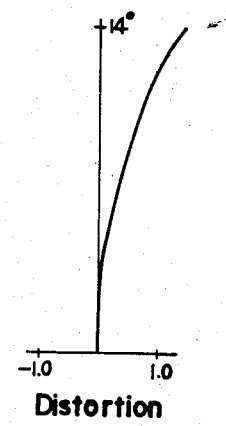
Figure 41D:
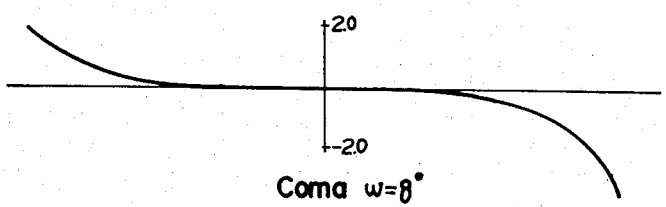

The twelfth embodiment is a further modification of the ninth embodiment and is illustrated in FIG. 40. FIGS. 41a, 41b, 41c and 41d disclose the graphical plots of aberrations.

Table 18

(Embodiment 12)
f=100.0 FNo.=2.04 2ω=28° Back Focal Distance s'=58.88

| Radius of Curvature | Axial Distance | Refractive Index | Abbe Number |
|---|---|---|---|
| $r_1$ = 49.102 | | | |
| | $d_1$ = 14.12 | $N_1$ = 1.6968 | $\nu_1$ = 55.8 |
| $r_2$ = −151.150 | | | |
| | $d_2$ = 8.24 | | |
| $r_3$ = −56.192 | | | |
| | $d_3$ = 4.03 | $N_2$ = 1.733 | $\nu_2$ = 28.1 |
| $r_4$ = 63.538 | | | |
| | $d_4$ = 14.86 | | |
| $r_5$ = −365.956 | | | |
| | $d_5$ = 2.94 | $N_3$ = 1.5699 | $\nu_3$ = 48.0 |
| $r_6$ = 87.565 | | | |
| | $d_6$ = 13.94 | $N_4$ = 1.744 | $\nu_4$ = 45.2 |
| $r_7$ = −37.025 | | | |
| | $d_7$ = 7.06 | | |
| $r_8$ = −30.841 | | | |
| | $d_8$ = 2.40 | $N_5$ = 1.6057 | $\nu_5$ = 37.8 |
| $r_9$ = −52.361 | | | |

($\Sigma I/\Sigma I$ = 25.3)

Figure 42:
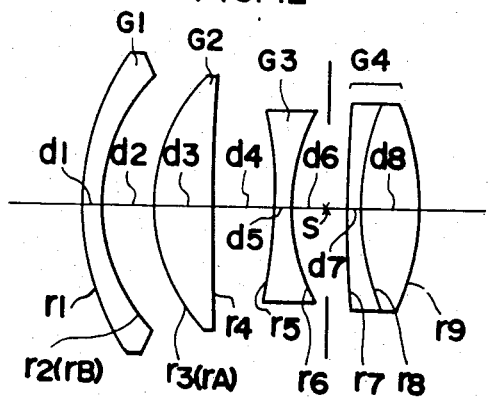
FIG. 42 is a schematic view of the thirteenth embodiment of the present invention.
Figure 43A:
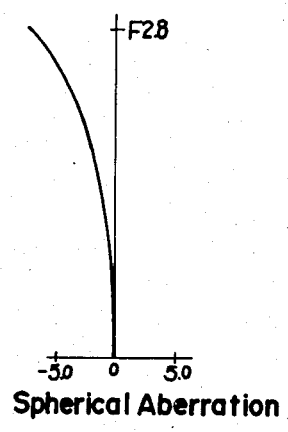
FIGS. 43a, 43b, 43c and 43d are graphical plots of aberrations of the thirteenth embodiment.
Figure 43B:
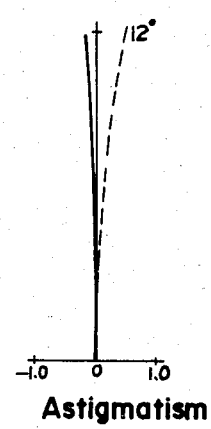
Figure 43C:
Figure 43D:
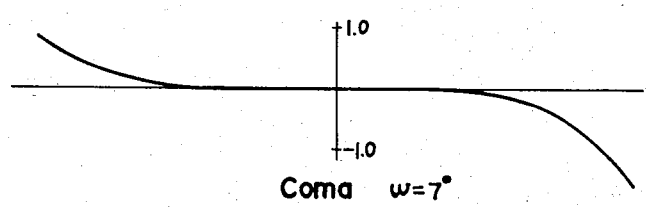

The thirteenth embodiment is disclosed in FIG. 42 and the graphical plots of aberrations are disclosed in FIGS. 43a, 43b, 43c and 43d. The thirteenth embodiment is basically a modification of the fourth embodiment and utilizes an air space lens which is defined between the surface $r_A$ and $r_B$ on the object side of the diaphragm. The lens parameters are set forth in the following Table 19.

Table 19

(Embodiment 13)
f=100.0 FNo.=2.8 2ω=24° Back Focal Distance s'=83.05

| Radius of Curvature | Axial Distance | Refractive Index | Abbe Number |
|---|---|---|---|
| $r_1$ = 49.886 | | | |
| | $d_1$ = 2.95 | $N_1$ = 1.5407 | $\nu_1$ = 46.8 |
| $r_2$ = 30.076 | | | |
| | $d_2$ = 9.08 | | |
| $r_3$ = 32.189 | | | |
| | $d_3$ = 9.92 | $N_2$ = 1.6935 | $\nu_2$ = 53.4 |
| $r_4$ = 479.156 | | | |
| | $d_4$ = 10.35 | | |
| $r_5$ = −96.018 | | | |
| | $d_5$ = 2.95 | $N_3$ = 1.6398 | $\nu_3$ = 34.7 |
| $r_6$ = 37.187 | | | |
| | $d_6$ = 9.08 | | |
| $r_7$ = 236.718 | | | |
| | $d_7$ = 2.32 | $N_4$ = 1.5407 | $\nu_4$ = 46.8 |
| $r_8$ = 48.410 | | | |
| | $d_8$ = 9.70 | $N_5$ = 1.6968 | $\nu_5$ = 55.8 |

Table 19-continued
(Embodiment 13)
f=100.0 FNo.=2.8 2ω=24° Back Focal Distance s'=83.05

| Radius of Curvature | Axial Distance | Refractive Index | Abbe Number |
|---|---|---|---|
| $r_9 = -57.880$ | | | |

($\Sigma I/\Sigma I = 41.5$)

Figure 44:
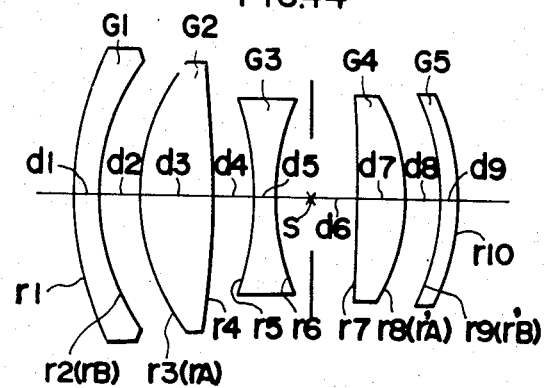
FIG. 44 is a schematic view of the fourteenth embodiment of the present invention.
Figure 45A:
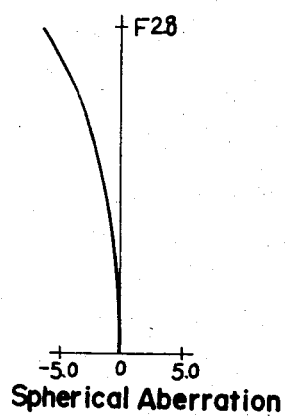
FIGS. 45a, 45b 45c and 45d are graphical plots of aberrations of the fourteenth embodiment.
Figure 45B:
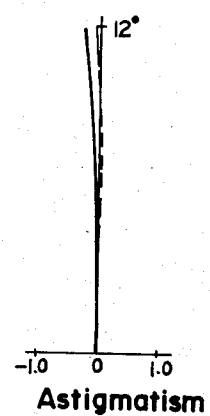
Figure 45C:
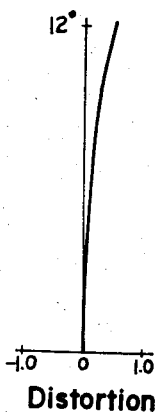
Figure 45D:
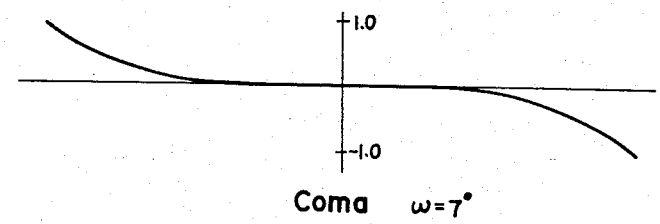

The final fourteenth embodiment is disclosed in FIG. 44 and represents a modification of the seventh embodiment. The graphical plots of aberration are disclosed respectively in FIGS. 45a, 45b, 45c and 45d. In the fourteenth embodiment, the air space lenses are positioned on either side of the diaphragm as noted in the $(r_B)$, $(r_A)$ and $(r'_A)$, $(r'_B)$. The parameters of this embodiment are set forth in the following Table 20.

Table 20
(Embodiment 14)
f=100.0 FNo.=2.8 2ω=24° Back Focal Distance s'=71.75

| Radius of Curvature | Axial Distance | Refractive Index | Abbe Number |
|---|---|---|---|
| $r_1 = 59.715$ | | | |
| | $d_1 = 3.06$ | $N_1 = 1.5176$ | $\nu_1 = 53.5$ |
| $r_2 = 35.166$ | | | |
| | $d_2 = 7.28$ | | |
| $r_3 = 36.556$ | | | |
| | $d_3 = 12.25$ | $N_2 = 1.7495$ | $\nu_2 = 50.1$ |
| $r_4 = -175.353$ | | | |
| | $d_4 = 7.22$ | | |
| $r_5 = -54.802$ | | | |
| | $d_5 = 3.67$ | $N_3 = 1.6727$ | $\nu_3 = 32.2$ |
| $r_6 = 45.273$ | | | |
| | $d_6 = 13.23$ | | |
| $r_7 = -3000.046$ | | | |
| | $d_7 = 9.19$ | $N_4 = 1.6779$ | $\nu_4 = 55.4$ |
| $r_8 = -36.164$ | | | |
| | $d_8 = 5.45$ | | |
| $r_9 = -35.616$ | | | |
| | $d_9 = 3.06$ | $N_5 = 1.5407$ | $\nu_5 = 46.8$ |
| $r_{10} = -48.514$ | | | |

While the preferred embodiments have been disclosed in an enabling manner to facilitate the reproduction of the present invention, it should be realized that various modifications can be easily accomplished by a person skilled in this field, and accordingly, the present invention should be measured solely from the following claims:

What is claimed is:

1. A soft focus lens system having an optical axis and a point of intersection for an off-axial principal ray with the optical axis comprising:
    a first lens group of positive refractive power having a first image side refracting surface concave to the point of intersection, the point of intersection being located within the first lens group; and
    a second lens group of negative refractive power located at the image side of the first lens group and having a second object side refracting surface adjacent to the first image side refracting surface to form a meniscus-shaped air space between the first and second refractive surfaces, the radius of curvature, $r_A$, of the first refracting surface and the radius of curvature, $r_B$, of the second refracting surface having values defined within the following ranges, respectively, wherein the focal length of the lens system is represented by f:

$$0.20 < |r_A|/f < 0.65 \quad (1)$$

$$0.18 < |r_B|/f < 0.45 \quad (2)$$

whereby an optimum degree of spherical aberration can be introduced into a transmitted image to provide a soft focus image.

2. A soft focus lens system as in claim 1, wherein the first lens group consists from the object side to the image side of a first positive lens, a second biconcave lens and a third positive lens having an image side surface identified as the first refracting surface and the second lens group consists of a fourth negative meniscus lens having an object side surface identified as the second refracting surface, the point of intersection being located between the second and third lenses of the first lens group.

3. A soft focus lens system as in claim 2, wherein the first, second, third and fourth lenses are single lenses, respectively.

4. A soft focus lens system as in claim 2, wherein the first, second and fourth lenses are single lenses, respectively, and the third lens is a doublet.

5. A soft focus lens system as in claim 1 wherein the first lens group is movable relatively to the second lens group for varying the width of the meniscus-shaped air space.

6. A soft focus lens system as in claim 5 further comprising means for shifting the first and second lens groups as a unit for focusing the lens system and means for shifting the first and second lens groups to varying the width of the meniscus-shaped air space.

7. A soft focus lens system as in claim 5, wherein the first lens group consists from the object to the image side, of a first side-group and a second sub-group movable relatively to the first sub-group and the lens system further comprises the first control means for shifting the first sub-group relative to the second sub-group for focusing and second control means for relatively shifting the first and second lens groups to varying the width of the meniscus-shaped air space.

8. A soft focus lens system as in claim 5, wherein the first lens group consists, from the object of the image side, of a first sub-group and a second sub-group movable relatively to the first sub-group and the lens system further comprises means for shifting the first and second lens groups as a unit for focusing the lens system and means for shifting the second lens group relative to the second sub-group with the position of the first sub-group relative to the second lens group maintained for varying the width of the meniscus-shaped air space.

9. A soft focus lens system as in claim 5, wherein the first lens group consists, from the object to the image side, of a first sub-group and a second sub-group movable relatively to the first sub-group, the lens system is shiftable as a unit for focusing and the second sub-group is shiftable relatively to the first sub-group and the second lens group for varying the width of the meniscus-shaped air space.

10. A soft focus lens system as in claim 5, wherein the first lens group consists, from the object to the image side, of a first sub-group and a second sub-group, the first subgroup being movable relatively to the second sub-group for maintaining the focal length of the lens system against any variation of the focal length during variation of the width of the meniscus-shaped air space.

11. A soft focus lens system as in claim 5, wherein the meniscus-shaped air space is variable and capable of changing the spherical aberration from a fine-corrected condition to a condition in which a desired spherical aberration is intentionally introduced.

12. A soft focus lens system as in claim 1, wherein the width of the meniscus-shaped air space is fixed and the ratio of the total spherical aberration coefficients of the fifth degree, $\Sigma I$, to the third degree, $\Sigma I^*$ is as follows:

$$\Sigma I^*/\Sigma I > 20$$

13. A soft focus lens system as in claim 1, wherein the radius of curvature, $r_A$, of the first refracting surface is greater than the radius of curvature, $r_B$, of the second refracting surface.

14. A soft focus lens system having an optical axis and a point of intersection for an off-axial principal ray with the optical axis comprising:
- a firt lens group of positive refractive power having a first image side refracting surface concave to the point of intersection, the point of intersection being located within the first lens group; and
- a second lens group of negative refractive power movable relatively to the first lens group on the image side thereof and having a second object side refracting surface adjacent to the first refracting surface to form a variable meniscus-shaped air space between the first and second refractive surfaces for controlling the degree of spherical aberration introduced into the lens system.

15. A soft focus lens system as in claim 14 further comprising means for shifting the first and second lens groups as a unit for focusing and control means for relatively shifting the first and second lens groups to varying the width of the meniscus-shaped air space.

16. A soft focus lens system as in claim 14, wherein the first lens group consists, from the object to the image side of, a first sub-group and a second sub-group movable relatively to the first sub-group and the lens system further comprises means for shifting the first sub-group relatively to the second sub-group for focusing the lens system and means for relatively shifting the first and second lens groups to varying the width of the meniscus-shaped air space.

17. An improved objective lens system having variable soft focus capability comprising:
- a first lens group;
- a second lens group adjacent to the first lens group;
- means for focusing the lens system on an object;
- varying means for varying the position of the first lens group relative to the position of the second lens group for controllably varying the amount of spherical aberration of the lens system to provide a soft focus image; and
- means, in automatic cooperation with the varying means, for maintaining the lens system focused on the object despite any variation of the position of the first lens group relative to the position of the second lens group during the controlled introduction of spherical aberration to provide the soft focus image.

18. A soft focus lens system having an optical axis defining a point of intersection for an off-axial principal ray within the lens system comprising:
- a first lens group including a first negative meniscus lens convex to the object side having an image side surface concave to the image side;
- a second lens group of a positive refractive power located at the image side of the first lens group including a second positive lens having an object side surface convex to the object side, a third biconcave lens, and a fourth positive lens having an image side surface convex to the image side, the point of intersection being between the third and fourth lens, the image side surface of the first negative meniscus lens having a radius of curvature, $r_B$, the object side surface of the second positive lens having a radius of curvature, $r_A$, to form a meniscus-shaped air space therebetween, wherein $r_B$ and $r_A$ fulfill the following conditions with the focal length of the lens system represented by $f$:

$$0.18 < |r_B|/f < 0.45$$

$$0.20 < |r_A|/f < 0.65.$$

19. A soft focus lens system as in claim 18, wherein:

$$|r_A| < |r_B|.$$

20. A soft focus lens system as in claim 18 further comprising a third lens group located at the image side of the second lens group including a fifth negative meniscus lens concave to the object side, the image side surface of the fourth positive lens having a radius of curvature, $r_A'$, the image side surface of the fifth negative meniscus lens having a radius of curvature, $r_B'$, to form a second meniscus-shaped air space therebetween, wherein $r_A'$ and $r_B'$ fulfill the following conditions:

$$0.20 < |r_A'|/f < 0.65$$

$$0.18 < |r_B'|/f < 0.45.$$

21. A soft focus lens system as in claim 18, wherein the first lens group is relatively shiftable to the second lens group for varying the meniscus-shaped air space.

22. A soft focus lens system as in claim 18, wherein the width of the meniscus-shaped air space is fixed and the ratio of the total spherical aberration coefficients of the fifth degree, $\Sigma I$, to the third degree, $\Sigma I$ is as follows:

$$\Sigma I/\Sigma I > 20.$$

* * * * *

UNITED STATES PATENT OFFICE
CERTIFICATE OF CORRECTION

Patent No. 4,124,276         Dated November 7, 1978

Inventor(s) YUKIO OKANO ET AL

It is certified that error appears in the above-identified patent and that said Letters Patent are hereby corrected as shown below:

Col. 6, Table 2, line 11 delete "-0.8814  -0.9784".
   Insert -- -0.4697-- under Astigmatism.  Insert -- -0.8814-- under Petzval Sum.  Insert -- -0.9784-- under Distortion.

Col. 7, Table 5, line 2 delete "(Embodiment 1)"and insert --(Embodiment 2)--.

Col. 11, line 33 after "three" insert --lens--.

Col. 12, line 8 delete "FIG. 24".

Col. 15, Table 15, line 21 delete "0.275" and insert -- -0.275--.

Col. 17, line 12 delete "$r_A$" and insert --$|r_A|$--.

Col. 19, line 59 delete "retracting" and insert --refracting--.

UNITED STATES PATENT OFFICE
CERTIFICATE OF CORRECTION

Patent No. 4,124,276    Dated November 7, 1978

Inventor(s) YUKIO OKANO ET AL

It is certified that error appears in the above-identified patent and that said Letters Patent are hereby corrected as shown below:

Col. 21, line 4 delete "$\Sigma I$, to the third degree, $\Sigma \overset{*}{I}$" and insert --$\Sigma I^*$, to the third degree, $\Sigma I$--.

Col. 22, line 51 delete the first occurrence of "$\Sigma I$" and insert --$\Sigma I^*$--.

Col. 22, line 53 delete "$\Sigma I/\Sigma I$" and insert --$\Sigma I^*/\Sigma I$--.

Signed and Sealed this

Fifth Day of June 1979

[SEAL]

Attest:

RUTH C. MASON
Attesting Officer

DONALD W. BANNER
Commissioner of Patents and Trademarks